(12) United States Patent
Wada

(10) Patent No.: US 6,870,666 B2
(45) Date of Patent: Mar. 22, 2005

(54) CONTROLLING APPARATUS AND CONTROLLING METHOD FOR WAVELENGTH DIVISION MULTIPLEXING OPTICAL AMPLIFIER

(75) Inventor: Tetsuo Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 10/327,025

(22) Filed: Dec. 24, 2002

(65) Prior Publication Data

US 2003/0123134 A1 Jul. 3, 2003

Related U.S. Application Data

(62) Division of application No. 09/656,416, filed on Sep. 6, 2000, now Pat. No. 6,560,008.

(30) Foreign Application Priority Data

Nov. 16, 1999 (JP) .......................................... 11-325809

(51) Int. Cl.[7] .................................................. H01S 3/00
(52) U.S. Cl. .............. 359/337; 359/341.41; 359/341.42
(58) Field of Search ........................... 359/337, 341.41, 359/341.42, 337.12

(56) References Cited

U.S. PATENT DOCUMENTS

| | | | |
|---|---|---|---|
| 5,680,490 A | 10/1997 | Cohen et al. | ................ 385/124 |
| 5,809,190 A | 9/1998 | Chen | |
| 5,828,486 A | * 10/1998 | Yoshida | .................. 359/337.12 |
| 5,907,429 A | * 5/1999 | Sugata | ................... 359/341.42 |
| 5,978,131 A | 11/1999 | Lauzon et al. | ............... 359/160 |
| 6,061,173 A | * 5/2000 | Yamane et al. | .............. 359/345 |
| 6,144,487 A | * 11/2000 | Michishita | ................ 359/337.1 |
| 6,151,160 A | 11/2000 | Ma et al. | ..................... 359/124 |
| 6,160,658 A | 12/2000 | Ishikawa | ..................... 359/130 |
| 6,163,393 A | 12/2000 | Wu et al. | ..................... 359/122 |
| 6,188,509 B1 | 2/2001 | Lee et al. | .................... 359/124 |
| 6,236,499 B1 | 5/2001 | Berg et al. | ................... 359/124 |
| 6,256,433 B1 | 7/2001 | Luo et al. | .................... 359/124 |
| 6,483,630 B2 * | 11/2002 | Kosaka | .................. 359/337.11 |

FOREIGN PATENT DOCUMENTS

| | | |
|---|---|---|
| GB | 2340326 B | 4/2001 |
| JP | 08-95097 | 4/1996 |
| JP | 08-248455 | 9/1996 |
| JP | 10-173266 | 6/1998 |

OTHER PUBLICATIONS

Kim et al, "A Novel Bidirectional Add/Drop Amplifier (BADA)" Aug. 1998, IEEE Photonics Technology Letters, vol. 10, No. 8, pp. 1118–1120.

(List continued on next page.)

*Primary Examiner*—Mark Hellner
(74) *Attorney, Agent, or Firm*—Staas Y Halsey LLP

(57) ABSTRACT

A controlling apparatus and a controlling method for a wavelength division multiplexing optical amplifier to reduce the controlling error due to noise light included in the monitoring light. The controlling apparatus branches, by a photocoupler, a portion of WDM signal light amplified by a light level controlling part and separates the branched light into groups of even-numbered channel components and odd-numbered channel components using a wavelength channel separate filter. Monitor signals corresponding to the light powers of the even-numbered group and odd-numbered group, respectively, are generated by respective photoelectric converting parts and LPF's. One of the monitor signals, which corresponds to one of the even-numbered group and the odd-numbered group, is selected by a monitor signal selecting/controlling part and then sent to a comparator. The control apparatus conducts feedback controlling in accordance with the output signal of the comparator, so that the light level controlling part conducts to ALC (automatic level control) operate.

8 Claims, 11 Drawing Sheets

OTHER PUBLICATIONS

Kim et al. "Bidrectional WDM Self–Healing Ring Network Based on Simple Bidirectional Add/Drop Amplifier Modules" Sep. 1998, IEEE Photonics Technology Letters, vol. 10, No. 9, pp. 1340–1342.

Karasek et al. "Analysis of Channel Addition/Removal Response in All–Optical Gain–Controlled Cascade of Erbuim–Doped Fibe Amplifier" Oct. 1998, Journal Lightwave Technology, vol. 16, No. pp. 1795–1803.

Park et al. "Dynamics Gain and Output Power Control in a Gain–Flattened Erbium–Doped Fiber Amplifier" Jun. 1998, IEEE Photonics Technology Letters, vol. 10, No. 6, pp. 787–789.

Suzuki et al. "Power Excursion Suppression in Cascades of Optical Amplifiers with Automatic Maximum Level Control" Aug. 1999, IEEE Photonics Technology Letters, vol. 11, No. 8, pp. 1051–1053.

Fukui et al. "1580nm Band All–Optical ADM Node Prototype Equipped With Fast Automatic Level Control" Sep. 1998, ECOC'98, pp. 571–572.

* cited by examiner

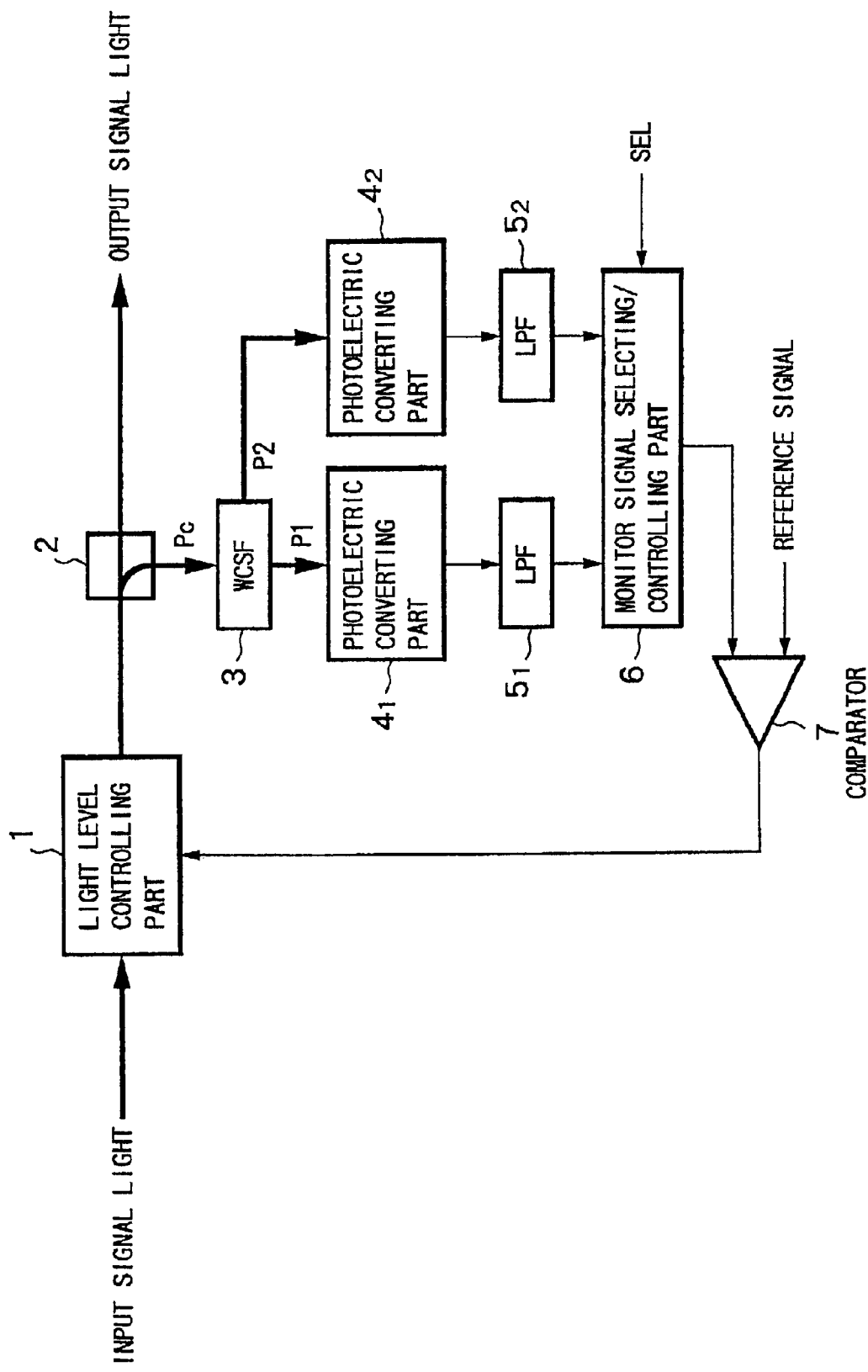

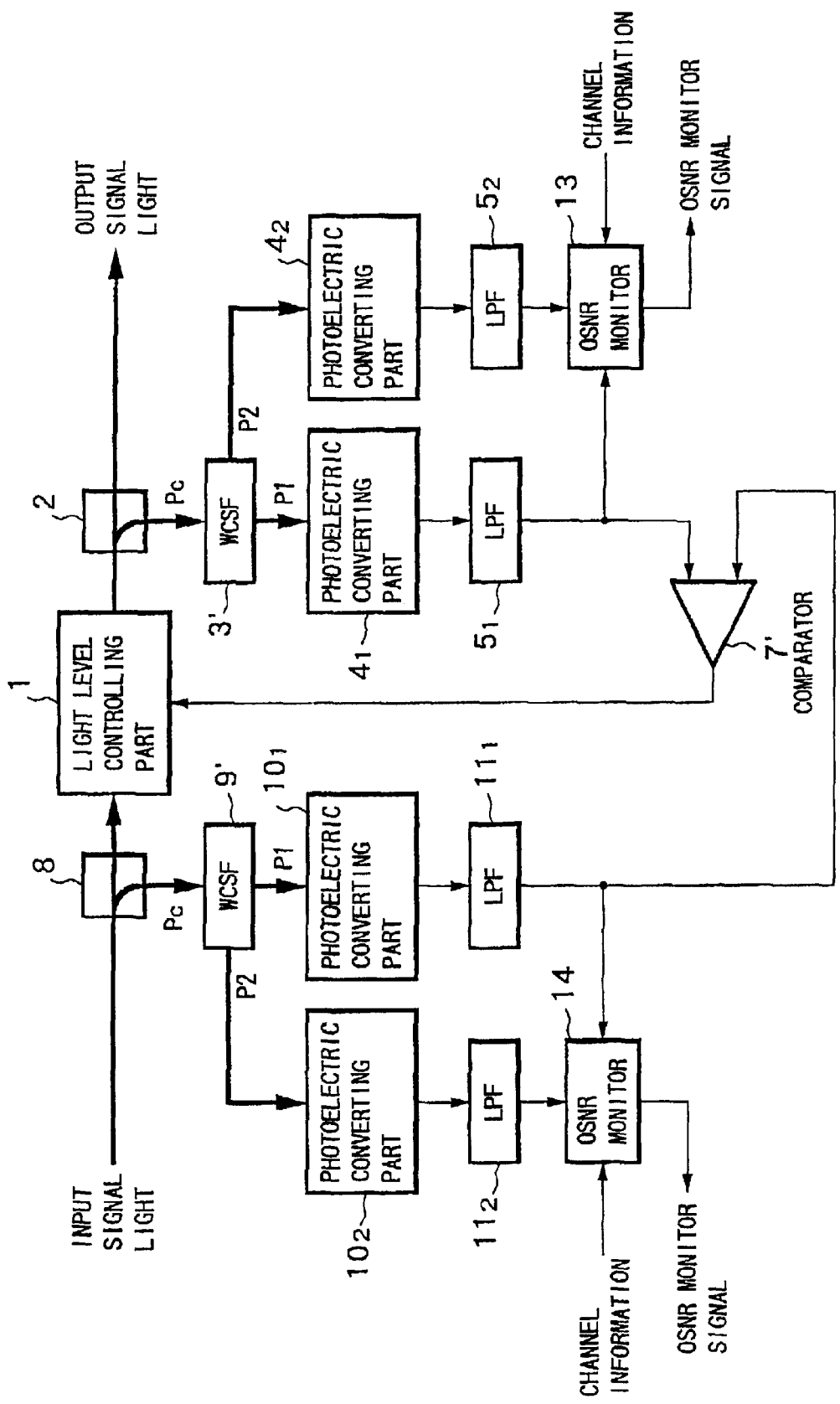

CONTROLLING APPARATUS AND CONTROLLING METHOD FOR WAVELENGTH DIVISION MULTIPLEXING OPTICAL AMPLIFIER

CROSS-REFERENCE TO RELATED APPLICATIONS

This application is a Divisional of application Ser. No. 09/656,416, filed Sep. 6, 2000, now U.S. Pat. No. 6,560,008.

BACKGROUND OF THE INVENTION

1. Field of the Invention

The present invention relates to a controlling apparatus and a controlling method for controlling a wavelength division multiplexing (WDM) optical amplifier for collectively amplifying wavelength division multiplexed signal light beams to be used in optical communications, and particularly to a controlling apparatus and a controlling method for a wavelength division multiplexing optical amplifier, capable of reducing errors due to the affection of noise light to thereby realize a controlling operation with high precision.

2. Description of the Related Art

Attention has been recently directed to an optical wavelength division multiplexing (WDM) transmission system, as a technique adapted to drastically increase a transmission capacity per one thread of optical fiber transmission path, and as a basic technique leading to a lightwave network constitution. On the other hand, optical amplifiers are able to linearly amplify optical signals without once converting them into electrical signals, to thereby largely improve regenerating and repeating intervals. Thus, optical amplifiers are widely used particularly in a main line transmission system. Further, since the optical wavelength division multiplexing transmission system is also able to collectively amplify a plurality of optical signals, so that the advantage of optical amplifiers can be effectively utilized.

In a conventional optical transmission system adopting optical amplifiers, it is impossible to obtain transmission channel information by monitoring such as overheads of electrical signals at an optical amplifying-repeating device (linear repeating station). Thus, as alternative means therefor, there is known a method for wavelength division multiplexing optical supervisory channel signal light (hereinafter called "OSC signal light") into main signal light. This OSC signal light is generated such as by a WDM terminal equipment at a transmission side and terminated at an optical amplifying-repeating device, and necessary information is again multiplexed into the OSC signal light, to be transferred to a WDM terminal equipment at a receiving side.

Level controlling systems for optical amplifiers to be used in the aforementioned optical transmission system include one for keeping constant the output level of an optical amplifier (hereinafter called "ALC system") and another for keeping constant the gain (a difference between input and output levels) of an optical amplifier (hereinafter called "AGC system").

FIG. 10 is a block diagram showing an exemplary constitution of a general ALC system. In the ALC system such as shown in FIG. 10, there is monitored a portion of output signal light output from light level controlling means including such as an optical amplifier and an optical attenuator, and such as the gain of the optical amplifier and the loss of the optical attenuator are feedback controlled so as to keep constant the averaged level of the output signal light.

FIG. 11 is a block diagram showing an exemplary constitution of a general AGC system. In the AGC system such as shown in FIG. 11, there are monitored a portion of input signal light into light level controlling means and a portion of output signal light output from light level controlling means, and the light level controlling means is feedback controlled so as to keep constant the difference between the averaged levels of the input light and output light.

In case of utilizing an optical amplifier in optical wavelength division multiplexing transmission, when the number of wavelength channels is changed while keeping a reference signal in FIG. 10 at a constant value under the control of ALC system, there is caused fluctuation in wavelength channel levels as shown in FIG. 12. Namely, if the number of wavelength channels is changed to 4 channels when the system is ALC operating with a setting that the number of wavelength channels is 2 channels, the light level controlling means is feedback controlled such that the averaged level of the whole of the output signal light at 2 channels and that at 4 channels are constant because the reference signal of a comparator is constant, resulting in the respective wavelength channel levels being lowered after changing the number of wavelength channels. As such, it is also necessary in the ALC system to change the reference signal corresponding to the number of wavelength channels being used. In this respect, it is possible to obtain the information about the number of wavelength channels being used, such as via the OSC signal light transmitted from the WDM terminal equipment at the transmission side to the optical amplifying-repeating device.

Meanwhile, when the optical amplifier is AGC operating, the levels of respective wavelength channels are kept constant as shown in FIG. 13 even if the number of wavelength channels is changed. Namely, since the difference between the averaged levels of the input light and output light is kept constant even if the number of wavelength channels is changed from 2 channels to 4 channels, the respective wavelength channel levels are controlled to be constant before and after the change of the number of wavelength channels.

However, in the conventional controlling method for an optical amplifier for optical wavelength division multiplexing as described above, there has existed a problem of a controlling error due to the affection of noise light called amplified spontaneous emission (ASE) light to be caused upon linearly amplifying optical signals.

FIG. 14 shows an example of a spectrum of an optical wavelength division multiplexed transmission signal, where the number of wavelength channels is 8 channels. In FIG. 14, what can be seen at the lower side of spectrum peaks of respective wavelength channels, is ASE light caused upon linearly amplifying optical signals.

The spectrum shape of ASE light is determined by the amplification band of an optical amplifier, optical amplifiers having wider amplification bands (i.e., capable of amplification of many wavelength channels) have wider noise bands, and the ASE light is accumulated whenever the linear amplification is repeated. Concerning the optical signal to be monitored when conducting the level control of an optical amplifier, the light powers of respective wavelength channels are not individually monitored, but the whole of the light output of the optical amplifier is monitored such as by a PD (photodetector). This results in the inclusion of the aforementioned ASE light, leading to an error upon conducting the level control of wavelength channel light. The controlling error due to ASE light becomes more apparent, when an optical amplifier having a wide band is to be used at a smaller number of wavelength channels, for example, when an optical amplifier having a wavelength band corresponding to 32 channels is used at 1 channel.

Further, the purpose of the ALC operation of a WDM optical amplifier is to suppress the drift of an input signal level such as due to the loss fluctuation of a transmission path, to thereby ensure a stable transmission quality. As such, it is also desired to ALC operate the optical amplifier when a wavelength channel(s) is(are) added or subtracted. However, in the conventional controlling method, it has been required to once stop the ALC, when adding/subtracting wavelength channel(s).

Further, when an optical amplifier is AGC operating, it is required that the amplitude and speed of level fluctuation to be caused by addition or subtraction of wavelength channels are within a range of the AGC operation response, such that the change of the number of wavelength channels does not affect the light levels of respective wavelength channel lights. However, the response speed of AGC by the conventional controlling method has not been necessarily at a sufficient level.

Still referring to FIG. 14, the ratio between the level of wavelength channel light and that of the noise light is called an optical signal to noise ratio (hereinafter called OSNR) which is an important parameter in evaluating the quality of optical transmission signals. To accurately measure the OSNR, it is necessary to measure the spectrum of optical signals, which requires a spectrum analyzer having a wide dynamic range. However, from the standpoint of simplification of the constitution of an optical amplifying-repeating device, it is not necessarily advisable to provide a spectrum analyzer in each optical amplifying-repeating device for the purpose of measuring the OSNR.

SUMMARY OF THE INVENTION

The present invention has been carried out in view of the conventional problems as described above, and it is therefore a first object of the present invention to reduce the controlling error due to the affection of noise light to thereby realize precise controlling of an optical amplifier. It is a second object to realize controlling of an optical amplifier capable of suppressing the drift of an input signal level such as due to the loss fluctuation of a transmission path, even when a wavelength channel(s) is(are) added or subtracted. It is a third object to realize controlling of an optical amplifier capable of reducing the aforementioned restriction of the AGC operation when adding or subtracting a wavelength channel(s). Further, it is a fourth object to realize a controlling method capable of readily monitoring the OSNR without measuring the spectrum of optical signals.

To achieve the above object, one aspect of the present invention provides a controlling apparatus for controlling an operation of a wavelength division multiplexing optical amplifier to collectively amplify wavelength division multiplexed signal light including a plurality of channel lights of different wavelengths, comprising: optical separating means for separating the wavelength division multiplexed signal lights into a plurality of wavelength groups; light power measuring means for measuring a light power per each of the plurality of wavelength groups separated by the optical separating means; and controlling means for controlling the operation of the wavelength division multiplexing optical amplifier based on the light power of one of the plurality of wavelength groups measured by the light power measuring means.

According to such a constitution, the wavelength division multiplexed signal light is divided into a plurality of wavelength groups, and the light power per each of the plurality of wavelength groups is measured by the light power measuring means. Further, one of the measured light powers of the respective wavelength groups is selected, and the operation of the wavelength division multiplexing optical amplifier is controlled by the controlling means based on the selected light power of the pertinent wavelength group. In this way, there is reduced the ratio of the noise light component included in the monitoring light to be used for controlling the optical amplifier, so as to reduce the controlling error due to the affection of noise light to thereby realize a controlling operation with high accuracy.

Further, the aforementioned controlling apparatus may further comprise: optical branching means for branching a portion of the wavelength division multiplexed signal light amplified by the wavelength division multiplexing optical amplifier, and for outputting the branched portion to the optical separating means; wherein the optical separating means has a transmission wavelength characteristic which periodically varies corresponding to the wavelength channel intervals of the wavelength division multiplexed signal light, and separates the portion of the wavelength division multiplexed signal light branched by the optical branching means into an even-numbered group including even-numbered channel lights and an odd-numbered group including odd-numbered channel lights; wherein the light power measuring means measures the respective light powers of the even-numbered group and the odd-numbered group separated by the optical separating means; and wherein the controlling means controls the operation of the wavelength division multiplexing optical amplifier, based on one of the light power of the even-numbered group and the light power of the odd-numbered group measured by the light power measuring means.

According to such a constitution, the optical branching means branches a portion of the wavelength division multiplexed signal light to be dealt with the wavelength division multiplexing optical amplifier, the thus branched portion of the signal light is separated into the even-numbered group and the odd-numbered group by the optical separating means, and the light powers of the respective groups are measured by the light power measuring means. Further, one of the measured light powers of the even-numbered group and odd-numbered group is selected, and the operation of the wavelength division multiplexing optical amplifier is controlled by the controlling means based on the thus selected light power of the pertinent group.

In the aforementioned controlling apparatus, the optical branching means may include an output side branching part for branching a portion of the wavelength division multiplexed signal light output from the wavelength division multiplexing optical amplifier; and the controlling means may include a constant-output-level controlling part for controlling the operation of the wavelength division multiplexing optical amplifier such that the output light level is constant, based on one of the light power of the even-numbered group and the light power of the odd-numbered group measured by the light power measuring means.

According to such a constitution, the output side branching part branches, as monitoring light, a portion of the wavelength division multiplexed signal light amplified by the wavelength division multiplexing optical amplifier, and the thus branched portion is separated by the optical separating means into the even-numbered group and odd-numbered group. Further, the wavelength division multiplexing optical amplifier is controlled to ALC operate by the constant-output-level controlling part, based on one of the light power of the even-numbered group and the light power of the odd-numbered group measured by the light power measuring means. In this way, it becomes possible to reduce the monitor level error of ALC due to the affection of noise light, thereby enabling realization of the ALC with high accuracy.

In addition, in the aforementioned controlling apparatus, the optical branching means may include an input side branching part for branching a portion of the wavelength division multiplexed signal light input into the wavelength division multiplexing optical amplifier, and an output side branching part for branching a portion of the wavelength division multiplexed signal light output from the wavelength division multiplexing optical amplifier, the optical separating means may include: an input side separating part for separating the portion of the wavelength division multiplexed signal light branched by the input side branching part into the even-numbered group and the odd-numbered group; and an output side separating part for separating the portion of the wavelength division multiplexed signal light branched by the output side branching part into the even-numbered group and the odd-numbered group, the light power measuring means may include: an input side light power measuring part for measuring the respective light powers of the even-numbered group and the odd-numbered group separated by the input side separating part; and an output side light power measuring part for measuring the respective light powers of the even-numbered group and the odd-numbered group separated by the output side separating part, and the controlling means may include a constant-gain controlling part for controlling the operation of the wavelength division multiplexing optical amplifier such that the level difference of the input light and output light of the wavelength division multiplexing optical amplifier is constant, based on one of the light powers of the even-numbered groups and the light powers of the odd-numbered groups measured by the input side light power measuring part and the output side light power measuring part, respectively.

According to such a constitution, the input light into and the output light from the wavelength division multiplexing optical amplifier are monitored, respectively, and the wavelength division multiplexing optical amplifier is controlled to AGC operate by the constant-gain controlling part based on one of the light powers of the even-numbered groups and the light powers of the odd-numbered groups as measured by the input side light power measuring part and the output side light power measuring part, respectively. In this way, it becomes possible to reduce the monitor level error of the AGC due to the affection of noise light, thereby enabling realization of the AGC with high accuracy.

The aforementioned controlling means of the controlling apparatus may include a selecting part for selecting, in accordance with a selection signal from the outside, one of the light power of the even-numbered group and the light power of the odd-numbered group measured by the light power measuring means, to control the operation of the wavelength division multiplexing optical amplifier based on the light power selected by the selecting part. Concretely, the controlling means preferably conducts the controlling, by selecting the light power of the odd-numbered group by the selecting part when the even-numbered channel is to be added or subtracted, and by selecting the light power of the even-numbered group by the selecting part when the odd-numbered channel is to be added or subtracted.

According to such a constitution, it becomes possible to select from the outside as to which of the monitoring values of the even-numbered group and odd-numbered group is to be used for controlling the optical amplifier. Further, when a wavelength channel is to be added or subtracted, there is selected the monitoring value of the wavelength group which does not include the wavelength channel to be added or subtracted. Thus, the operation of the optical amplifier can be continuously controlled without any interruption, even when adding or subtracting wavelength channels.

Another aspect of the present invention further provides a controlling apparatus for controlling an operation of a wavelength division multiplexing optical amplifier to collectively amplify wavelength division multiplexed signal light including a plurality of channel lights of different wavelengths, comprising: optical branching means for branching a portion of the wavelength division multiplexed signal light; optical separating means having a transmission wavelength characteristic which periodically varies corresponding to the wavelength channel intervals of the wavelength division multiplexed signal light, and separating the portion of the wavelength division multiplexed signal light branched by the optical branching means into a signal component including the channel lights of respective wavelengths and noise lights around the channel lights and a noise component including the noise lights existing in wavelength bands between the respective wavelength channel lights; light power measuring means capable of measuring the light power of the signal component separated by the optical separating means; and controlling means for controlling the operation of the wavelength division multiplexing optical amplifier based on the light power of the signal component measured by the light power measuring means.

According to such a constitution, the optical branching means branches a portion of the wavelength division multiplexed signal light to be dealt with the wavelength division multiplexing optical amplifier, the thus branched portion of the signal light is separated into the signal component and the noise component by the optical separating means, and at least the light power of the signal component is measured by the light power measuring means. Further, the operation of the wavelength division multiplexing optical amplifier is controlled by the controlling means based on the measured light power of the signal component. In this way, there is reduced the ratio of the noise light component included in the monitoring light to be used for controlling the optical amplifier, so as to reduce the controlling error due to the affection of noise light to thereby realize a controlling operation with high accuracy.

In the aforementioned controlling apparatus, the optical branching means may include an output side branching part for branching a portion of the wavelength division multiplexed signal light output from the wavelength division multiplexing optical amplifier; and the controlling means may include a constant-output-level controlling part for controlling the operation of the wavelength division multiplexing optical amplifier such that the output light level is constant, based on the light power of the signal component measured by the light power measuring means.

According to such a constitution, the output side branching part branches, as monitoring light, a portion of the wavelength division multiplexed signal light amplified by the wavelength division multiplexing optical amplifier, and the thus branched portion is separated by the optical separating means into the signal component and the noise component. Further, the wavelength division multiplexing optical amplifier is controlled to ALC operate by the constant-output-level controlling part based on the light power of the signal component measured by the light power measuring means. In this way, it becomes possible to reduce the monitor level error of ALC due to the affection of noise light, thereby enabling realization of the ALC with high accuracy.

In the aforementioned controlling apparatus, the optical branching means may include: an input side branching part for branching a portion of the wavelength division multiplexed signal light input into the wavelength division multiplexing optical amplifier; and an output side branching part for branching a portion of the wavelength division multiplexed signal light output from the wavelength division multiplexing optical amplifier, the optical separating means may include: an input side separating part for separating the portion of the wavelength division multiplexed signal light branched by the input side branching part into the signal component and the noise component; and an output side separating part for separating the portion of the wavelength division multiplexed signal light branched by the output side branching part into the signal component and the noise component, the light power measuring means may include: an input side light power measuring part capable of measuring the light power of the signal component separated by the input side separating part; and an output side light power measuring part capable of measuring the light power of the signal component separated by the output side separating part, and the controlling means may include a constant-gain controlling part for controlling the operation of the wavelength division multiplexing optical amplifier such that the level difference of the input light and output light of the wavelength division multiplexing optical amplifier is constant, based on the light powers of the signal components measured by the input side light power measuring part and the output side light power measuring part, respectively.

According to such a constitution, the input light into and the output light from the wavelength division multiplexing optical amplifier are monitored, respectively, and the wavelength division multiplexing optical amplifier is controlled to AGC operate by the constant-gain controlling part based on the light powers of the signal components measured by the input side light power measuring part and the output side light power measuring part, respectively. In this way, it becomes possible to reduce the monitor level error of the AGC due to the affection of noise light, thereby enabling realization of the AGC with high accuracy.

In addition, in the aforementioned controlling apparatus, the light power measuring means may be capable of measuring the light powers of the signal component and the noise component separated by the optical separating means, and the controlling apparatus may further comprise OSNR calculating means for calculating an averaged value of OSNR's of the wavelength division multiplexed signal light, making use of the light powers of the signal component and the noise component measured by the light power measuring means, respectively, and making use of channel information concerning used wavelengths.

According to such a constitution, the averaged value of the OSNR's of the wavelength division multiplexed signal light can be readily calculated by the OSNR calculating means, making use of the light powers of the signal component and the noise component to be monitored for controlling the optical amplifier.

Still another aspect of the present invention provides a controlling method for controlling an operation of a wavelength division multiplexing optical amplifier to collectively amplify wavelength division multiplexed signal light including a plurality of channel lights of different wavelengths, comprising: an optical separating step for separating the wavelength division multiplexed signal light into a plurality of wavelength groups; a light power measuring step for measuring a light power per each of the plurality of wavelength groups separated by the optical separating step; and a controlling step for controlling the operation of the wavelength division multiplexing optical amplifier based on the light power of one wavelength group, measured by the light power measuring step.

Yet another aspect of the present invention further provides a controlling method for controlling an operation of a wavelength division multiplexing optical amplifier to collectively amplify wavelength division multiplexed signal light including a plurality of channel lights of different wavelengths, comprising: an optical separating step for branching a portion of the wavelength division multiplexed signal light, and separating the thus branched portion into a signal component including the channel lights of respective wavelengths and noise lights around the channel lights and a noise component including the noise lights existing in wavelength bands between the respective wavelength channel lights; a light power measuring step for measuring the light power of the signal component separated by the optical separating step; and a controlling step for controlling the operation of the wavelength division multiplexing optical amplifier based on the light power of the signal component measured by the light power measuring step.

Further objects, features and advantages of the present invention will become more apparent from the following description of preferred embodiments when read in conjunction with the accompanying drawings.

BRIEF DESCRIPTION OF THE DRAWINGS

FIG. 1 is a block diagram showing a constitution of a first embodiment of the present invention;

FIG. 9 is a block diagram showing a constitution of a fifth embodiment of the present invention;

DETAILED DESCRIPTION OF THE PREFERRED EMBODIMENTS

Figure 2A:
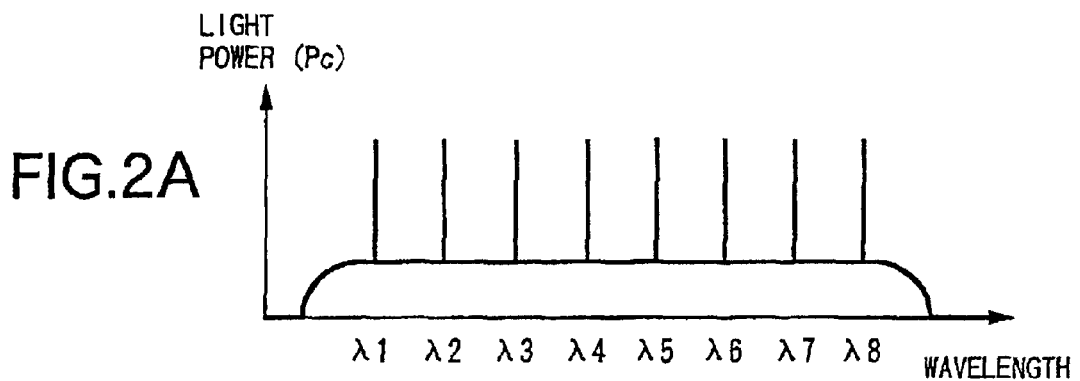
FIG. 2 is a view explaining a transmission wavelength characteristic of a WCSF used in the first embodiment.

There will be described hereinafter embodiments according the present invention, with reference to the accompanying drawings.

FIG. 1 is a block diagram of a first embodiment showing a basic constitution of a controlling apparatus for a WDM optical amplifier according to the present invention. In the first embodiment, there will be described a situation where the WDM optical amplifier is controlled to ALC operate.

In FIG. 1, the present apparatus is constituted of: a light level controlling part 1; a photocoupler 2 as an output side branching part; a wavelength channel separate filter 3 (hereinafter called WCSF) as optical separating means; photoelectric converting parts $4_1$, $4_2$ as light power measuring means; electric filters (LPF's) $5_1$, $5_2$; a monitor signal selecting/controlling part 6; and a comparator 7. In this case, the electric filters (LPF's) $5_1$, $5_2$, the monitor signal selecting/controlling part 6 and the comparator 7 cooperatively function as a constant-output-level controlling part.

The light level controlling part 1 is constituted to include a known optical amplifier such as an optical fiber amplifier doped with a rare earth element, capable of collectively amplifying input signal lights. This light level controlling part 1 may further include a variable optical attenuator for adjusting the level of WDM signal light amplified by the optical amplifier. At this light level controlling part 1, the gain of the optical amplifier or the attenuation amount of the variable optical attenuator is adjusted corresponding to an output signal from the comparator 7, to thereby generate output signal light having an output level controlled to be constant.

The photocoupler 2 branches a portion of the output signal light output from the light level controlling part 1, and passes the thus branched light to a port Pc of the WCSF 3.

The WCSF 3 has a transmission wavelength characteristic which periodically varies corresponding to the wavelength channel intervals of the WDM signal light, and separates the WDM signal light received at the port Pc, into an even-numbered group including even-numbered channel lights and an odd-numbered group including odd-numbered channel lights, to output the even-numbered group from port P1 and odd-numbered group from port P2, respectively.

FIG. 2 is a view explaining a transmission wavelength characteristic of the WCSF 3.

FIG. 2A is a view showing wavelength characteristics of a light power of the WDM signal light input into the port Pc. There will be considered a situation where such as eight channel lights of wavelength $\lambda1$ through wavelength $\lambda8$ are arranged at equal intervals. What can be seen at the lower side of spectrum peaks of respective wavelength channels, are ASE light components.

Figure 2B:
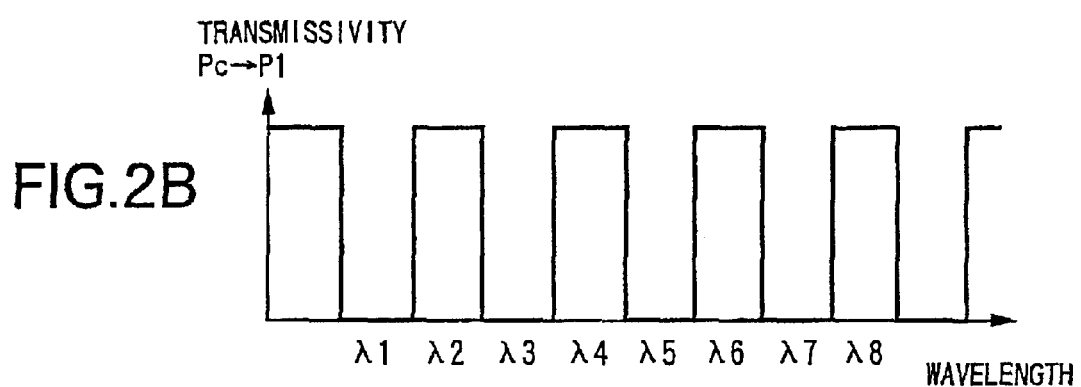

FIG. 2B schematically shows a transmission wavelength characteristic from the port Pc to the port P1 of the WCSF 3. Concretely, the transmissivity of the WCSF 3 is high for each of predetermined wavelength widths centered around even-numbered wavelengths $\lambda2$, $\lambda4$, $\lambda6$ and $\lambda8$, and is low for each of predetermined wavelength widths centered around odd-numbered wavelengths $\lambda1$, $\lambda3$, $\lambda5$ and $\lambda7$. It is noted that the transmission wavelength characteristic from the port Pc to the port P2 is reverse to that shown in FIG. 2B.

Figure 2C:
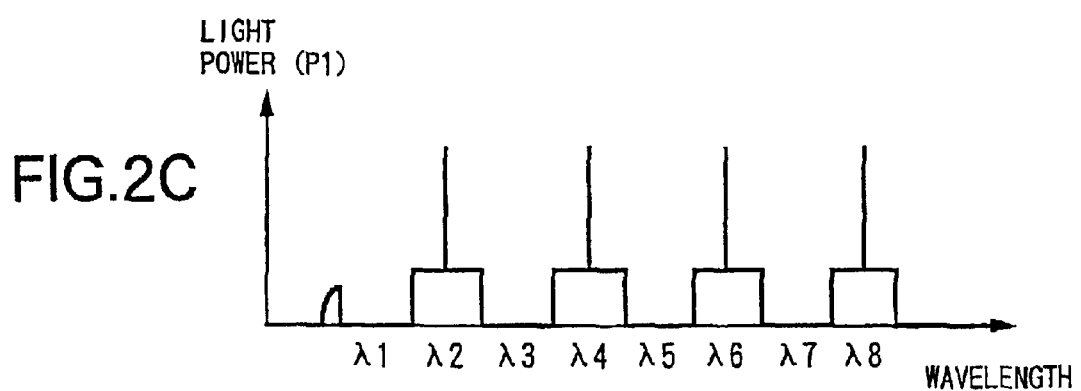
Figure 2D:
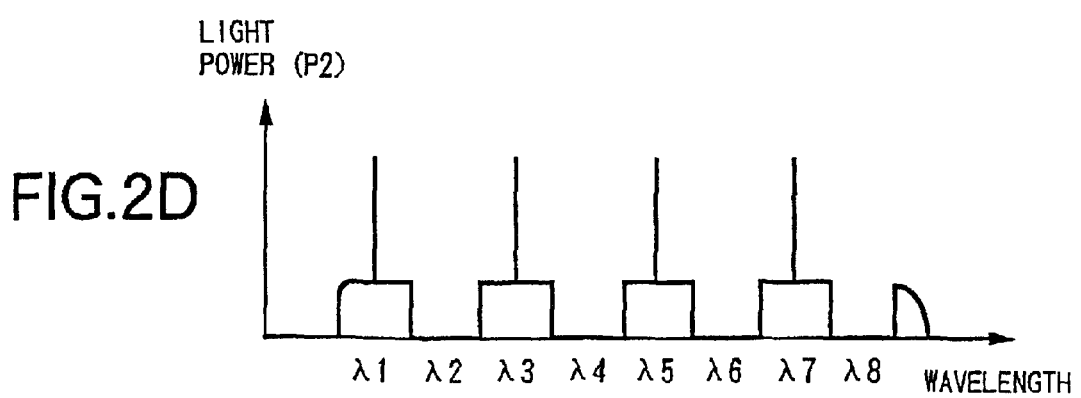

FIG. 2C shows wavelength characteristics of a light power of the output light from the port P1 of the WCSF 3, exhibiting that the port P1 outputs the components (even-numbered group) including the channel lights of the even-numbered wavelengths $\lambda2$, $\lambda4$, $\lambda6$ and $\lambda8$ and the ASE light components around them, respectively. FIG. 2D shows wavelength characteristics of a light power of the output light from the port P2 of the WCSF 3, exhibiting that the port P2 outputs the components (odd-numbered group) including the channel lights of the odd-numbered wavelengths $\lambda1$, $\lambda3$, $\lambda5$ and $\lambda7$ and the ASE light components around them, respectively.

For a concrete example of the WCSF 3 having the aforementioned characteristics, a technique known from U.S. Pat. No. 5,809,190 is applicable, and Mach-Zender Interleaver™ of ITF Optical Technologies Co., Ltd., for example, can be used. The WCSF to be used for the present invention is not limited to the aforementioned ones.

The photoelectric converting parts $4_1$, $4_2$ receive the optical signals output from the ports P1 and P2 of the WCSF 3, respectively, and convert them into electrical signals, respectively. For these parts, it is possible to adopt general photodetectors corresponding to the wavelength bands of the WDM signal light, respectively.

The electric filters $5_1$, $5_2$ filter out useless components included in the electrical signals output from the photoelectric converting parts $4_1$, $4_2$, respectively, and have a function to adjust the time constant of the controlling loop.

The monitor signal selecting/controlling part 6 selects one of the signals output from the electric filters $5_1$, $5_2$, in accordance with a selection signal SEL such as provided from the outside, to output the selected signal, and this part 6 functions as a selecting part here. The selection signal SEL is used to determine as to which of the even-numbered group and odd-numbered group is to be adopted as a monitor signal for ALC, corresponding to the status of use of the wavelength channel lights included in the WDM signal light output from the light level controlling part 1. In case of adopting the even-numbered group, the output signal from the electric filter $5_1$ is selected and output to the comparator 7, and in case of adopting the odd-numbered group, the output signal from the electric filter $5_2$ is selected and output to the comparator 7.

The comparator 7 receives the monitor signal selected at the monitor signal selecting/controlling part 6, and a reference signal set corresponding to the status of use of the wavelength channel lights included in the WDM signal light, and compares the level of the monitor signal with that of the reference signal. Concretely, there is generated a signal such as corresponding to the difference between the levels of the reference signal and monitor signal, and this signal shall be output to the light level controlling part 1. At the light level controlling part 1 receiving this output signal from the comparator 7, the gain of the optical amplifier or the attenuation amount of the variable optical attenuator is adjusted.

In the controlling apparatus having the constitution as described above, after the input signal light is amplified by the optical amplifier of the light level controlling part 1 (or, after the input signal light is attenuated, in case of having a variable optical attenuator), the thus processed input signal light is output to the outside via the photocoupler 2 while the portion of the output signal light is branched and passed to the port Pc of the WCSF 3.

At the WCSF 3, the WDM signal light received at the port Pc is separated into the even-numbered group and odd-numbered group which will be then output from the port P1 and port P2, respectively. It should be noted here that the ASE light component output from each of the port P1, port P2 is reduced to a half, as compared to the ASE light component input into the port Pc (see FIG. 2A, FIG. 2C and FIG. 2D). Namely, considering a situation where the number of wavelength channel lights included in the input signal light (i.e., the number of used wavelengths) is less (such as when the used wavelength is the wavelength λ1 only in FIG. 2A), the ASE light component before passing through the WCSF 3 exists throughout the whole of the amplification band of the optical amplifier, but the ASE light component to be output from one of the ports after passing through the WCSF 3 is reduced to approximately a half of that before passing, thereby reducing the ratio of ASE light component to the total light power to be detected at the photoelectric converting part at the latter stage. This means that the level monitoring error of the ALC at the less number of used wavelengths can be improved by using the WCSF 3.

The optical signals separated by the WCSF 3 into the even-numbered group and odd-numbered group are photo-electrically converted by the photoelectric converting parts $4_1$, $4_2$, respectively, and then sent to the monitor signal selecting/controlling part 6 via the electric filters $5_1$, $5_2$, respectively. At the monitor signal selecting/controlling part 6, there is selected one of the output signal (corresponding to the total light level of the even-numbered group) from the electric filter $5_1$ and the output signal (corresponding to the total light level of the odd-numbered group) from the electric filter $5_2$ in accordance with the selection signal SEL from the outside, and the thus selected output signal is output as the monitor signal for the ALC. For example, when the used wavelength is only the wavelength λ1 as described above, the output signal from the electric filter $5_2$ is selected in accordance with the selection signal SEL which is set to select the odd-numbered group, and the thus selected output signal is sent to the comparator 7. Desirably, the way for setting the selection signal SEL is to select the group which includes more of the used wavelengths out of the even-numbered wavelengths and odd-numbered wavelengths. By such setting, it becomes possible to further reduce the ratio of the ASE light component included in the total light power of the selected optical signal.

At the comparator 7 which has received the monitor signal from the monitor signal selecting/controlling part 6, the monitor signal level is compared with the reference signal level, and an output signal corresponding to the level difference is sent to the light level controlling part 1. The reference signal used herein is a signal set corresponding to the number of used wavelengths included in the selected monitor signal. For example, when the used wavelength is λ1 only, the reference signal is to have a signal level corresponding to a value obtained by adding the ASE light power separable as the odd-numbered group at the WCSF 3, to the light power required for the channel light of the wavelength λ1.

At the light level controlling part 1, the gain of the optical amplifier is controlled corresponding to the level difference indicated by the output signal from the comparator 7 (it is also possible to control the light attenuation amount, in case of providing a variable optical attenuator). Concretely considering a situation where the gain of the optical amplifier is controlled, when the monitor signal level is greater than the reference signal level, the gain of the optical amplifier is adjusted to be reduced by an amount corresponding to the level difference, and when the monitor signal level is smaller than the reference signal level, the gain of the optical amplifier is adjusted to be increased by an amount corresponding to the level difference. In this way, the output signal light level is controlled to a required constant level corresponding to the reference signal.

There will be now described the controlling operation of the present apparatus where a wavelength channel(s) to be used is(are) added or subtracted. It is only supposed that the wavelength channels to be simultaneously added or subtracted are restricted to either the even-numbered wavelengths or odd-numbered wavelengths.

For example, there is considered a subtracting situation where the channel light of wavelength λ8 is excluded from the usage of all the wavelength λ1 through wavelength λ8 as shown in FIG. 2A. In this case, the selection signal SEL is set to necessarily select the monitor signal corresponding to the odd-numbered group, and the reference signal is set to a level corresponding to the odd-numbered group. Thus, even in case of such subtraction, the ALC can be conducted based on the monitoring light power of the odd-numbered group which does not include the subtracted channel. In this way, the ALC operation, which has been conventionally interrupted, can be performed without any interruption. Also, even in case of addition, the ALC can be continuously conducted based on the monitoring light power of the component which does not include the wavelength channel(s) to be added, similarly to the aforementioned operation.

According to the first embodiment as described above, a portion of the output signal light branched as the monitoring light for ALC is separated into the even-numbered group and odd-numbered group by means of the WCSF 3, and the output level of the light level controlling part 1 is controlled to be constant based on the monitoring light power of one of the thus separated components. Thus, the error due to the ASE light component in level monitoring of the ALC is reduced, thereby enabling realization of an ALC operation with high accuracy. Further, since the ALC operation can be conducted continuously even when adding or subtracting a wavelength channel(s), it becomes possible to provide a controlling apparatus for a WDM optical amplifier capable of suppressing the drift of an input signal level such as due to the loss fluctuation of a transmission path, even when adding or subtracting a wavelength channel(s).

There will be described hereinafter a second embodiment of the present invention. In this case, there will be considered a situation where a WDM optical amplifier is controlled to AGC operate.

Figure 3:
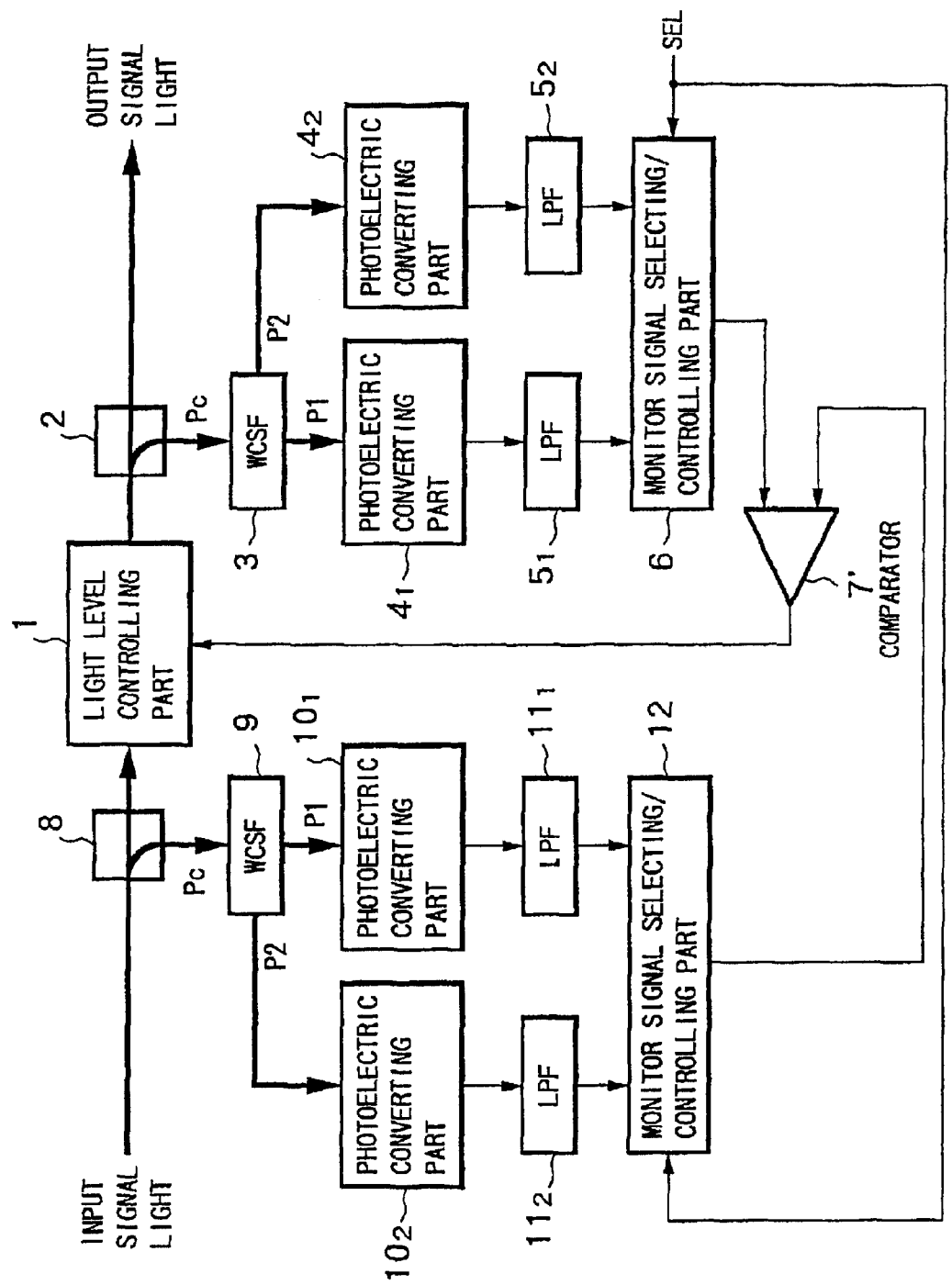
FIG. 3 is a block diagram showing a constitution of a second embodiment of the present invention.

FIG. 3 is a block diagram of the second embodiment showing a basic constitution of a controlling apparatus for a WDM optical amplifier according to the present invention. Those parts identical with the constitution of the first embodiment are denoted by the same reference numerals, and the same rule applies corresponding to the following.

The controlling apparatus of FIG. 3 is provided by arranging, in the constitution of the first embodiment, an additional constitution for monitoring a portion of the input signal light at the input side of the light level controlling part 1, to thereby render the light level controlling part 1 to AGC operate based on the difference between the input and output light levels. Concretely, similarly to the constitution of the output side of the first embodiment, there are also provided at the input side of the light level controlling part 1: a photocoupler 8 for branching a portion of the input signal light; a WCSF 9 for separating the optical signal branched by the photocoupler 8 into an even-numbered group and an odd-numbered group; a photoelectric converting part 10 for converting the optical signals of the even-numbered group output from a port P1 of the WCSF 9, into electrical signals; a photoelectric converting part 102 for converting the optical signals of the odd-numbered group output from a port P2 of the WCSF 9, into electrical signals; electric filters (LPF) $11_1$, $11_2$ for filtering out useless components included in the electrical signals output from the photoelectric converting parts $10_1$, $10_2$, respectively, and having a function to adjust the time constant of the AGC loop; and a monitor signal selecting/controlling part 12 for selecting one of the signals output from the electric filters $11_1$, $11_2$, in accordance with the selection signal SEL, to thereby output the selected signal. Mutually compared at a comparator 7' are a monitor signal level output from the monitor signal selecting/controlling part 12 at the input side and another monitor signal level output from the monitor signal selecting/controlling part 6 at the output side. Corresponding to the result of this comparison, the operation of the light level controlling part 1 is controlled such that the difference of the input and output light levels is constant.

Thus, in the second embodiment, the photocoupler 8 and photocoupler 2 correspond to an input side branching part and an output side branching part, respectively; the WCSF 9 and WCSF 3 correspond to an input side separating part and an output side separating part, respectively; the photoelectric converting parts $10_1$, $10_2$ and photoelectric converting parts $4_1$, $4_2$ correspond to an input side light power measuring part and an output side light power measuring part, respectively; and the electric filters $11_1$, $11_2$, electric filters $5_1$, $5_2$, monitor signal selecting/controlling parts 12, 6 and the comparator 7' cooperatively correspond to a constant-gain controlling part.

In the controlling apparatus having the aforementioned constitution, portions of the WDM signal lights input into and output from the light level controlling part 1 are branched by the photocouplers 8 and 2, respectively, and sent to the ports Pc of the WCSF's 9 and 3, respectively. At the WCSF's 9 and 3, the WDM signal lights input into the ports Pc are separated into even-numbered groups and odd-numbered groups, respectively, which are then output from the ports P1 and ports P2, respectively. The output lights from the ports P1 and P2 of WCSF's 9 and 3 are converted into electrical signals by the photoelectric converting parts $10_1$, $10_2$, $4_1$, $4_2$ connected to the ports, respectively, and the electrical signals are then sent to the monitor signal selecting/controlling parts 12, 6 via the electric filters $11_1$, $11_2$, $5_1$, $5_2$, respectively.

Similarly to the first embodiment, the monitor signal selecting/controlling parts 12, 6 select one of the output signals from the electric filters $11_1$, $5_1$ (corresponding to the total light levels of the even-numbered groups) and the output signals from the electric filters $11_2$, $5_2$ (corresponding to the total light levels of the odd-numbered groups) in accordance with the selection signal SEL from the outside, respectively, and the thus selected output signals are output as monitor signals for the AGC to the comparator 7'. This comparator 7' compares the monitor signal level from the monitor signal selecting/controlling part 12 at the input side with the monitor signal level from the monitor signal selecting/controlling part 6 at the output side, and sends an output signal corresponding to the level difference to the light level controlling part 1. This level difference between the input light and output light corresponds to the gain at the light level controlling part 1. At the light level controlling part 1, the optical amplifying operation (gain setting) such as of an optical amplifier is adjusted so that the level difference represented by the output signal from the comparator 7' is fixed at a previously set level difference (gain).

When adding or subtracting a usage wavelength channel(s), the AGC is continued by selecting the monitor signal corresponding to the even-numbered group or odd-numbered group, which does not include the wavelength channel(s) to be added or subtracted, similarly to the aforementioned first embodiment. In this way, there can be reduced the restriction due to the response speed of the controlling loop of AGC, such as concerning the amplitude and speed of level fluctuation to be caused when adding or subtracting wavelength channels.

In the second embodiment as described above, a portion of the input signal light and a portion of the output signal light branched as monitoring light for AGC are separated into even-numbered groups and odd-numbered groups of wavelength channels by the WCSF 9 and WCSF 3, respectively, and the light level controlling part 1 is gain-constant controlled based on the monitoring light powers of one of the even-numbered groups and the odd-numbered groups. Thus, the level monitoring error due to the ASE light component in the AGC can be reduced, and the restriction due to the response speed of the controlling loop of the AGC when adding or subtracting wavelength channel(s), thereby enabling realization of an AGC operation with higher accuracy.

There will be described hereinafter a third embodiment of the present invention. There will be considered here a concrete example of a controlling apparatus for a WDM optical amplifier which simultaneously realizes ALC and AGC by combining the basic constitutions of the aforementioned first and second embodiments with each other.

Figure 4:
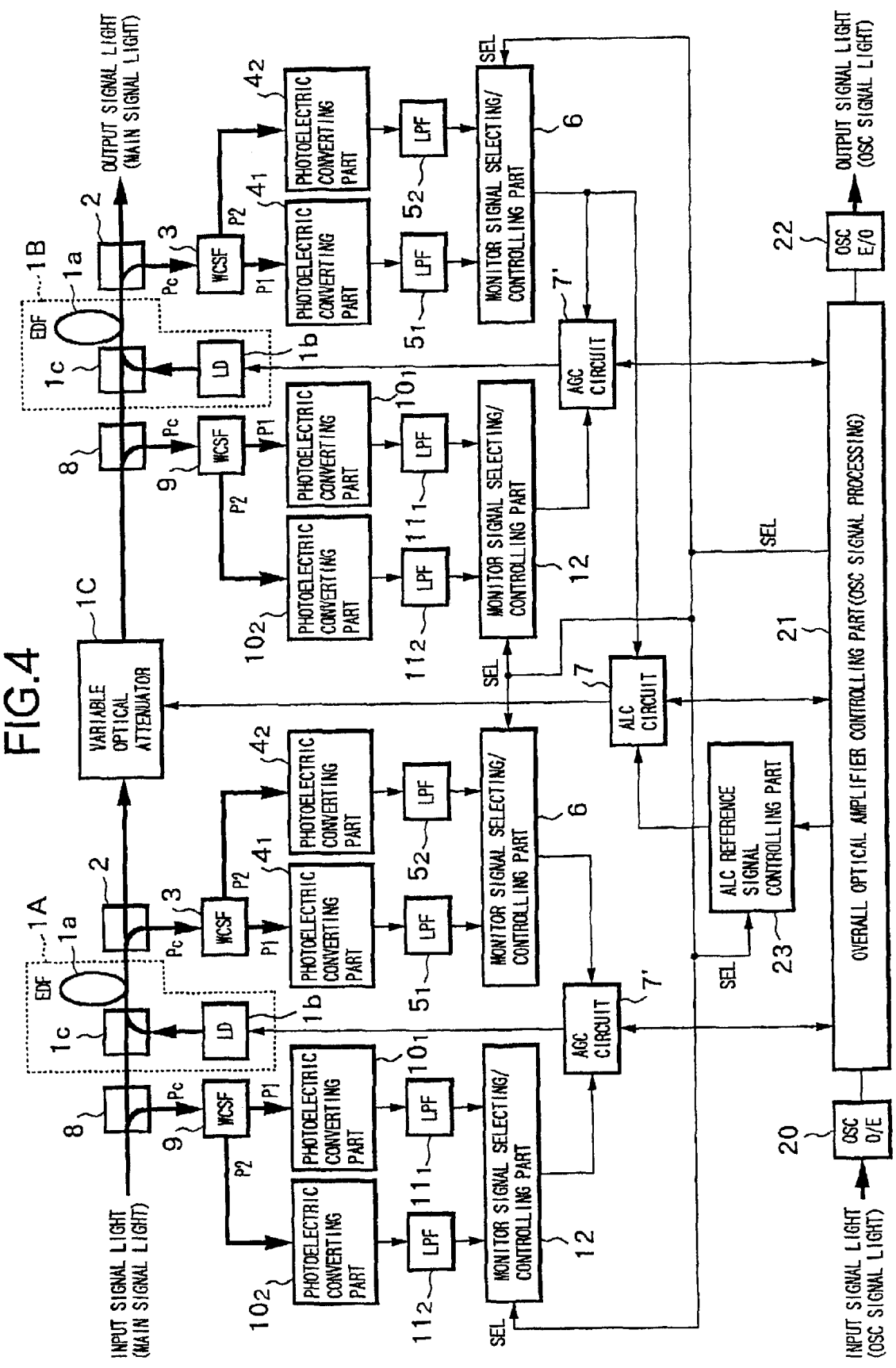
FIG. 4 is a block diagram showing a constitution of a third embodiment of the present invention.

FIG. 4 is a view showing a constitution of a controlling apparatus for a WDM optical amplifier according to the third embodiment.

In FIG. 4, this apparatus is provided by applying the basic constitutions of the aforementioned first and second embodiments to a WDM optical amplifier such as having a two-staged amplifying constitution comprising a former optical amplifying part 1A and a latter optical amplifying part 1B cascaded via a variable optical attenuator 1C.

Concretely, the basic constitution shown in FIG. 3 is applied to each of the former optical amplifying part 1A and latter optical amplifying part 1B which correspond to the aforementioned light level controlling part 1, to thereby render the optical amplifying parts 1A and 1B at both stages to AGC operate. Further, there is provided an ALC circuit (comparator) 7 for controlling the attenuation amount of the variable optical attenuator 1C at the middle stage such that the output signal light level is constant based on the monitor signal output from the monitor signal selecting/controlling part 6 arranged at the output side of the latter optical amplifying part 1B. It is noted that the respective AGC circuits 7' provided corresponding to the former and latter optical amplifying parts 1A, 1B have functions identical with that of the comparator shown in FIG. 3.

As concrete examples of the former optical amplifying part 1A and latter optical amplifying part 1B, FIG. 4 shows a basic constitution of an erbium doped optical fiber amplifier. Namely, each of the optical amplifying parts 1A and 1B is constituted to include: an erbium doped optical fiber (EDF) 1a; an exciting light source (LD) 1b for generating exciting light at a wavelength band capable of bringing the EDF 1a into an excited state; and a WDM coupler 1c for supplying the exciting light generated at the exciting light source 1b to the EDF 1a; in which the driving state of the exciting light source 1b is adjusted corresponding to the output signal from the AGC circuit 7', so that the gain of the optical amplification is controlled to be constant.

Although FIG. 4 shows a forward excitation type constitution, the constitution of an optical amplifying part, to which the present invention is applied, may be of a backward excitation type or bi-directional excitation type constitution. Further, although there has been described a situation adopting an erbium doped optical fiber amplifier in this embodiment, the present invention is not limited thereto and can be applied to an optical fiber amplifier such as doped with a rare earth element other than erbium and to a semiconductor optical amplifier.

Further, the present apparatus is provided with a constitution for processing OSC signal light sent from the outside, to thereby generate a selection signal SEL to be sent to the respective monitor signal selecting/controlling parts 6 and 12. Concretely, there are provided an OSC light receiving part (OSC O/E) 20, an overall optical-amplifier controlling part 21, and an OSC light transmitting part (OSC E/O) 22. The OSC light receiving part 20 extracts the OSC signal light included in the input signal light, and converts the OSC signal light into an electrical signal. The overall optical-amplifier controlling part 21 utilizes the output signal from the OSC light receiving part 20 to thereby identify the channel information of the main signal light included in the input signal light, so as to generate the selection signal SEL based on this channel information, and so as to generate an electrical signal for placing the required information among the identified channel information again into the OSC signal light to transfer to the downstream side. The OSC light transmitting part 22 generates OSC signal light in accordance with the electrical signal output from the overall optical-amplifier controlling part 21.

The present apparatus is further provided with an ALC reference signal controlling part 23 for generating a reference signal for setting a reference level of the ALC, based on the channel information identified by the overall optical-amplifier controlling part 21 and the selection signal SEL.

In the controlling apparatus having the aforementioned constitution, the main signal light included in the input signal light is sent to the former optical amplifying part 1A and amplified thereby, and the OSC signal light included in the input signal light is photoelectrically converted by the OSC light receiving part 20 and sent to the overall optical-amplifier controlling part 21. Similarly to the second embodiment, a portion of the input light to the former optical amplifying part 1A and a portion of the output light from the part 1A are monitored via the WCSF's 9 and 3, and the monitor signals corresponding to one of the even-numbered groups and odd-numbered groups selected at the monitor signal selecting/controlling parts 12, 6, respectively, are sent to the AGC circuit 7' at the former stage. Each AGC circuit 7' determines the difference between input and output light levels based on the monitor signals from the respective monitor signal selecting/controlling parts 12, 6, and outputs a controlling signal for constant-gain operating the former optical amplifying part 1A.

As the selection signal SEL to be used by the monitor signal selecting/controlling parts 12, 6 at this time, there is adopted the signal generated by the overall optical-amplifier controlling part 21. The overall optical-amplifier controlling part 21, based on the electrical signal corresponding to the OSC signal light input via OSC light receiving part 20 thereto, identifies the channel information representing: the numbers of the wavelength channels and the number of channels included in the main signal light; and information concerning the addition or subtraction of wavelength channel(s). Further, in accordance with this channel information, there is generated the selection signal SEL designating the selection of one of the even-numbered group and odd-numbered group. This selection signal SEL is sent to the monitor signal selecting/controlling parts 12, 6 at the former and latter stages, and also to the ALC reference signal controlling part 23. Further, the identified channel information is sent to the AGC circuits 7' at the former and latter stages and to the ALC circuit 7, so that this information is utilized for changing the setting level of the AGC and ALC. Further, the overall optical-amplifier controlling part 21 transmits necessary information included in the identified channel information, as OSC signal light via the OSC light transmitting part 22 to the outside.

The main signal light, amplified by the former optical amplifying part 1A which is AGC operating, is sent via the variable optical attenuator 1C to the latter optical amplifying part 1B and amplified thereby. Also concerning a portion of the input light into the latter optical amplifying part 1B and a portion of the output light from this part 1B, there is selectively monitored one of the even-numbered group and odd-numbered group, in a manner similar to the aforementioned former stage side, so that the latter optical amplifying part 1B is constant-gain controlled by the AGC circuit 7'. Further, the monitor signal output from the monitor signal selecting/controlling part 6 at the output side is also sent to the ALC circuit 7. Similarly to the aforementioned first embodiment, the ALC circuit 7 compares the monitor signal level from the monitor signal selecting/controlling part 6 and the ALC reference signal level from the ALC reference signal controlling part 23 with each other, and, corresponding to the comparison result, outputs a controlling signal for adjusting the attenuation amount of the variable optical attenuator 1C so the output level of the main signal light is constant.

According to the aforementioned controlling operation, while the former optical amplifying part 1A and the latter optical amplifying part 1B will AGC operate, the optical amplifier will ALC operate as a whole since the attenuation amount of the variable optical attenuator 1C is feedback controlled.

In case of addition or subtraction of wavelength channels, there are selected, by the selection signal SEL, those monitor signals corresponding to the even-numbered groups or odd-numbered groups which do not include wavelength channel (s) to be added or subtracted, in the manner as described in the aforementioned first embodiment. Thus, the ALC operation and the AGC operation are maintained even when adding or subtracting is carried out.

Figure 5:
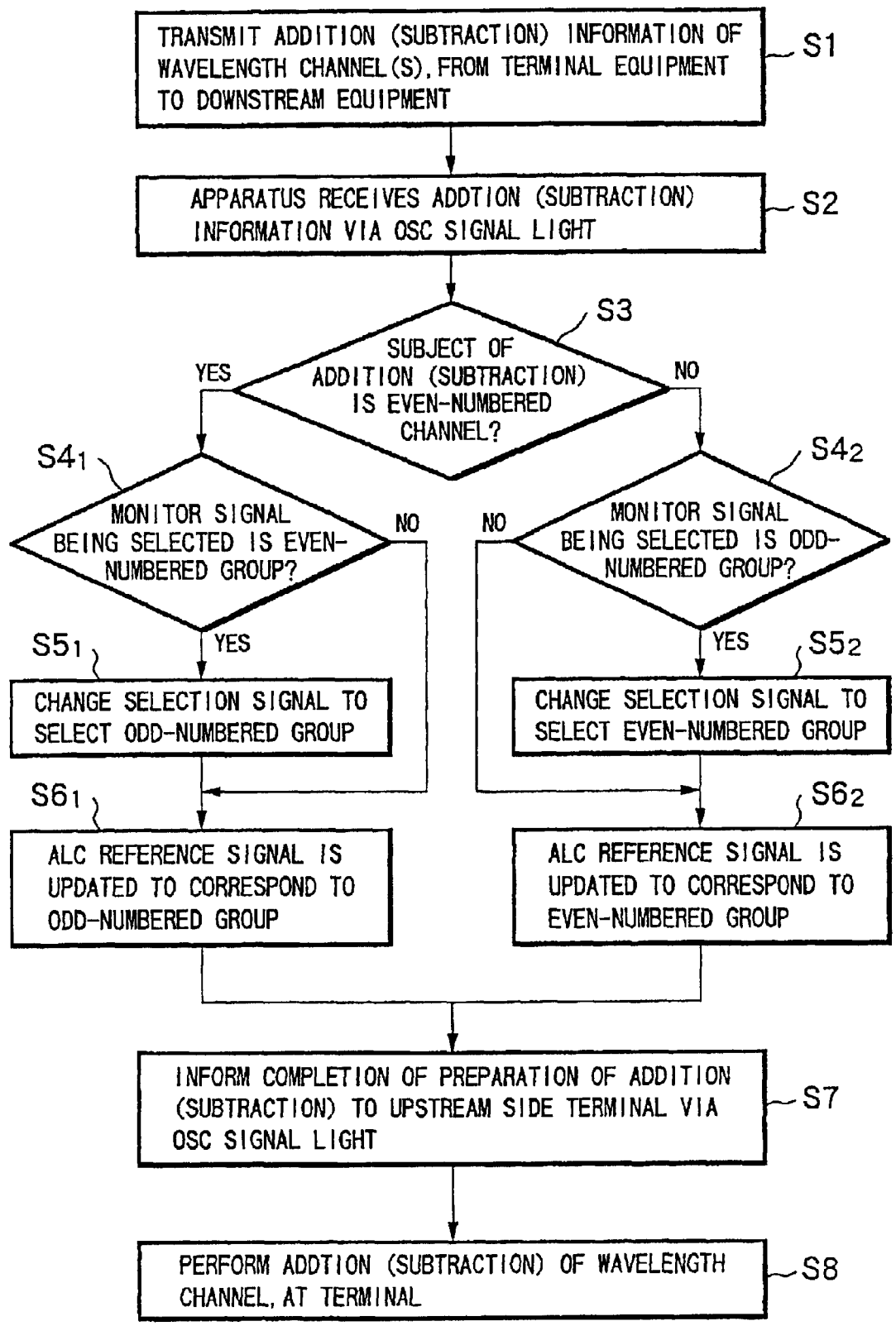
FIG. 5 is a flowchart showing an exemplary operation when adding (or subtracting) a wavelength channel(s) in the third embodiment.

FIG. 5 is a flowchart showing an example of concrete controlling operation when adding (subtracting) a wavelength channel(s).

As shown in FIG. 5, in case of occurrence of addition (subtraction) of a wavelength channel(s), the information concerning the addition (subtraction) of the wavelength channel(s) is firstly transmitted from a terminal equipment (not shown) at the transmission (upstream) side to an equipment (not shown) at the receiving (downstream) side, at step 1 (designated as S1 in the figure, and the same rule applies corresponding to the following). At step 2, the information concerning the addition (subtraction) of the wavelength channel(s) is received by the overall optical-amplifier controlling part 21 of the present apparatus via OSC signal light.

At step 3, it is judged by the overall optical-amplifier controlling part 21, whether the subject of the addition (subtraction) is an even-numbered channel or odd-numbered channel. If the subject is an even-numbered channel, the flow goes to step $4_1$.

At step $4_1$, it is judged whether the monitor signal selected before the addition (subtraction) corresponds to the even-numbered group. When the even-numbered group is being selected, the flow advances to step $5_1$, where the content of the selection signal SEL is changed to select the odd-numbered group. Conversely, when the odd-numbered group is being selected, the current selection signal SEL is maintained, and the flow transfers to step $6_1$. At step $6_1$, the ALC reference signal is updated to correspond to the odd-numbered group, and the flow transfers to step 7.

Meanwhile, when it is judged at step 3 that the subject of the addition (subtraction) is an odd-numbered channel, the flow advances to step $4_2$, where it is judged whether the monitor signal selected before the addition (subtraction) corresponds to the odd-numbered group. When the odd-numbered group is being selected, the flow advances to step $5_2$, where the content of the selection signal SEL is changed to select the even-numbered group. Conversely, when the even-numbered group is being selected, the current selection signal SEL is maintained, and the flow transfers to step $6_2$. At step $6_2$, the ALC reference signal is updated to correspond to the even-numbered group, and the flow transfers to step 7.

At step 7, the completion of preparation of the addition (subtraction) of the wavelength channel is informed to the terminal at the upstream side, via a backward OSC signal light (not shown). At step 8, the addition (subtraction) of the wavelength channel is performed at the terminal which has received the information of the completion of preparation of the addition (subtraction) from the downstream side equipment.

According to the third embodiment as described above, there are simultaneously performed the AGC and ALC of the optical amplifying parts 1A and 1B at the former and latter stages, by a level monitoring method utilizing the WCSF's (wavelength channel separate filters), for a known WDM optical amplifier such as having a two-staged amplifying constitution, thereby enabling the realization of an amplifying operation of WDM signal light with higher precision while reducing the level monitoring error due to the ASE light component. Further, since the selection signal SEL is generated by utilizing the OSC signal light, it becomes possible to readily apply the present invention as an optical amplifying-repeating device in various WDM optical transmission systems.

Figure 6A:
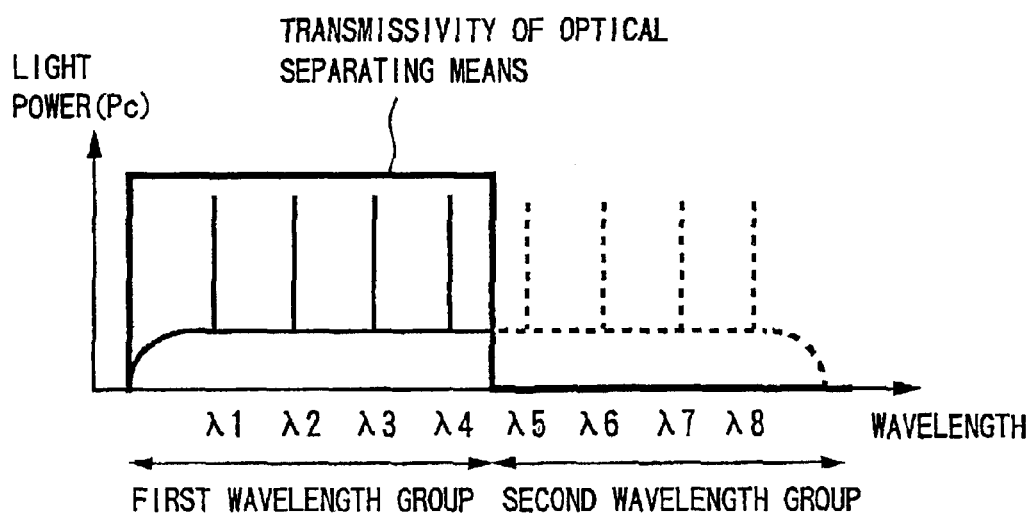
FIG. 6 is a view explaining exemplary characteristics of other optical separating means relating to the first through third embodiments.
Figure 6B:
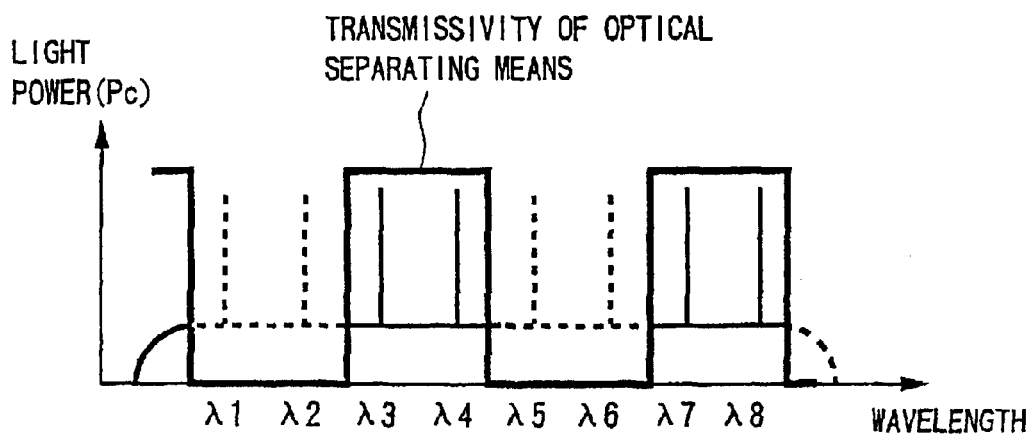

In the aforementioned first through third embodiments, the WDM signal light has been separated into the even-numbered group and odd-numbered group, making use of the WCSF. However, the present invention is not limited thereto, and it is possible to achieve the reduction of the level monitoring error due to the ASE light component insofar as the WDM signal light is divided into a plurality of wavelength groups. For example, as shown in FIG. 6A, it is possible to divide WDM signal light into a first wavelength group and a second wavelength group around the border near the center of the signal light band, and to control an optical amplifier based on a light power measured for one of the wavelength groups (in the figure, the first wavelength group). Further, as shown in FIG. 6B, it is also possible to periodically separate wavelength channels by a WCSF, such that two or more neighboring wavelength channels (in the drawing, two neighboring wavelength channels) are processed to be one unit.

There will be described hereinafter a fourth embodiment of the present invention.

In the aforementioned first through third embodiments, the WDM signal light branched for monitoring is separated into the even-numbered group and odd-numbered group by means of the WCSF, and one component of the groups is selected to conduct the ALC and/or AGC. However, in this fourth embodiment, there will be considered a situation where the ALC is conducted such that the monitor signal light is separated into a signal component and a noise component, by changing the periodical transmission wavelength characteristic of the WCSF.

Figure 7:
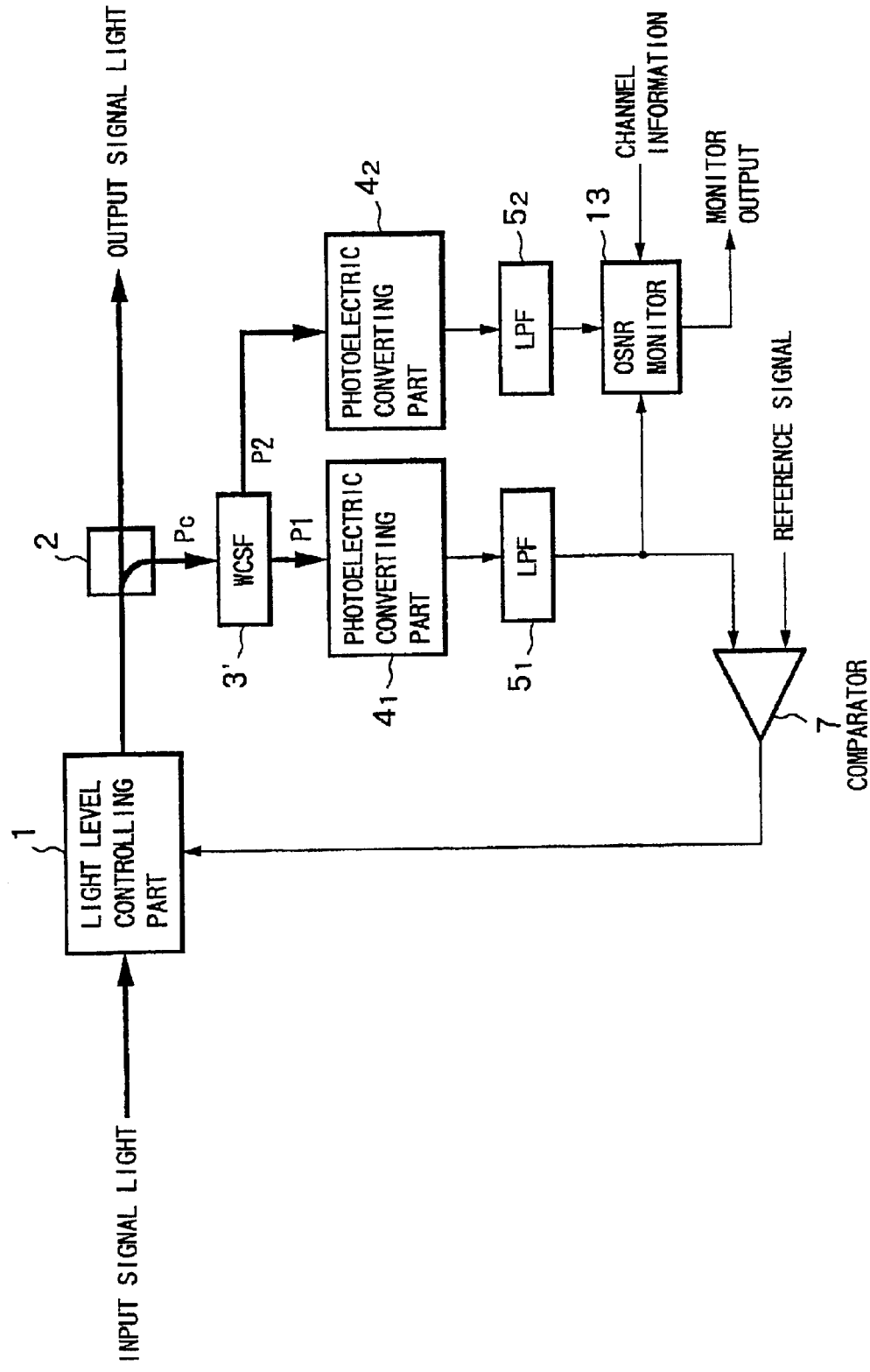
FIG. 7 is a block diagram showing a constitution of a fourth embodiment of the present invention.

FIG. 7 is a view showing a constitution of a controlling apparatus for a wavelength division multiplexing optical amplifier according to the fourth embodiment of the present invention.

In FIG. 7, the difference of the constitution of this apparatus from that of the first embodiment shown in FIG. 1 resides in that: there is adopted, instead of the WCSF 3, a WCSF 3' having a periodical transmission wavelength characteristic different from that of the WCSF 3; the monitor signal selecting/controlling part 6 is omitted and the output signal from the electric filter $5_1$ is sent to the ALC circuit 7; and there is provided an OSNR monitor 13 as OSNR calculating means for monitoring an OSNR (optical signal to noise ratio) of the output signal light. The constitution other than the above is identical with that of the first embodiment, so that its explanation is omitted here.

The WCSF 3' has a transmission wavelength characteristic which periodically varies corresponding to the wavelength channel intervals of the WDM signal light, and separates the WDM signal light beams received at the port Pc into a signal component including the channel lights of respective wavelengths and noise lights around the channel lights and a noise component including the noise lights existing in wavelength bands between the respective wavelength channel lights, to output the signal component from the port P1 and the noise component from the port P2.

FIG. 8 is a view explaining the transmission wavelength characteristic of the WCSF 3'.

Figure 8A:
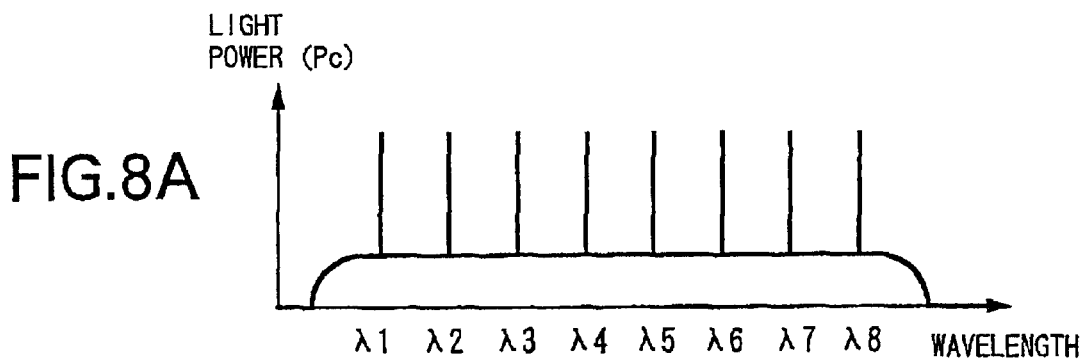
FIG. 8 is a view explaining a transmission wavelength characteristic of a WCSF used in the fourth embodiment.

FIG. 8A is a view showing wavelength characteristics of a light power of the WDM signal light input into the port Pc. There will be considered a situation where such as eight channel lights of wavelength λ1 through wavelength λ8 are arranged at equal intervals. What can be seen at the lower side of spectrum peaks of respective wavelength channels, are ASE light components.

Figure 8B:
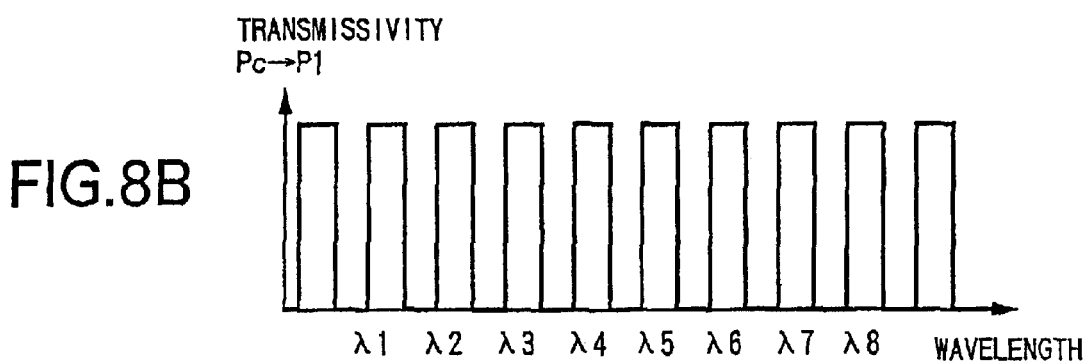

FIG. 8B schematically shows a transmission wavelength characteristic from the port Pc to the port P1 of the WCSF 3'. Concretely, the transmissivity of the WCSF 3' is high for each of predetermined wavelength widths centered around the wavelengths λ1 through λ8, and is low for each of predetermined wavelength widths intermediate between the wavelengths λ1 through λ8, respectively. It is noted that the a transmission wavelength characteristic from the port Pc to the port P2 is reverse to that shown in FIG. 8B.

Figure 8C:
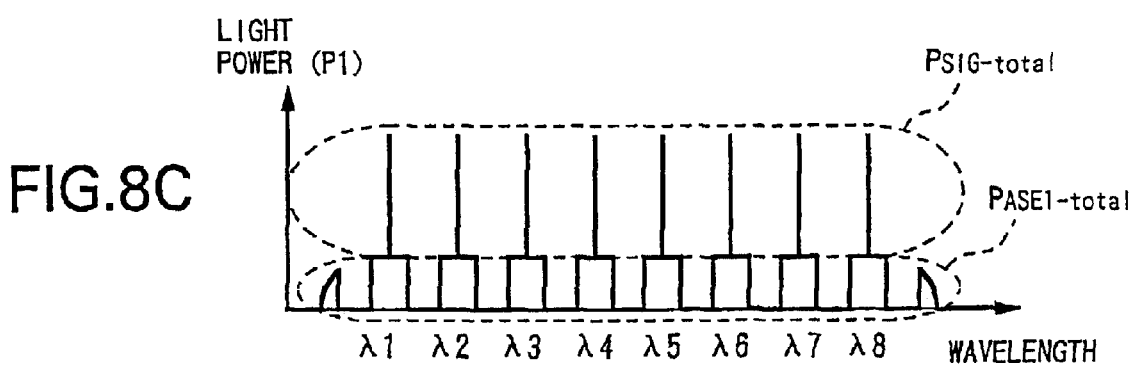
Figure 8D:
Figure 10:
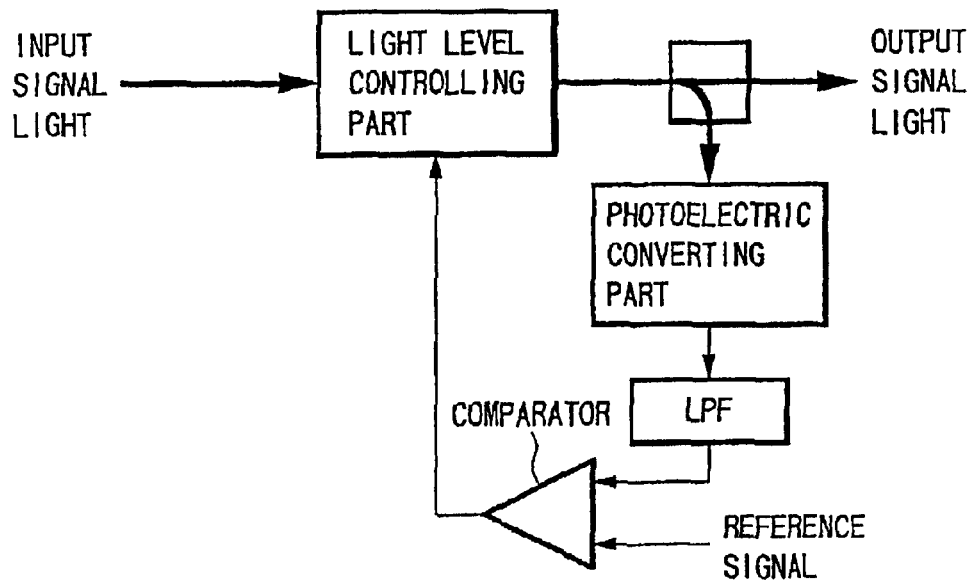
FIG. 10 is a block diagram showing an exemplary constitution of a general ALC system.
Figure 11:
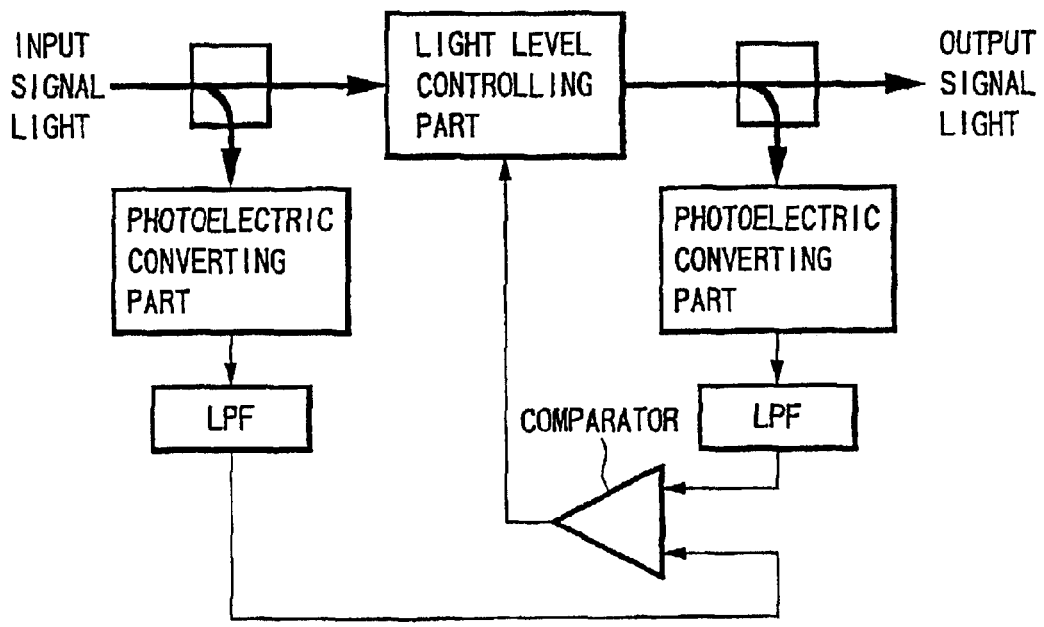
FIG. 11 is a block diagram showing an exemplary constitution of a general AGC system.
Figure 12:
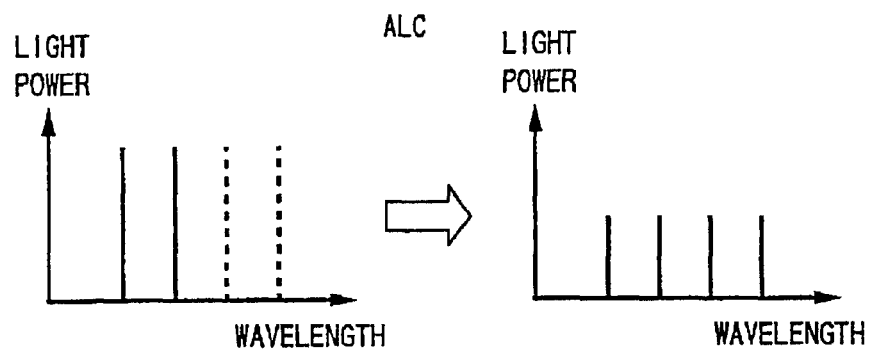
FIG. 12 is a view showing a transition where the number of wavelength channels is changed in a general ALC system.
Figure 13:
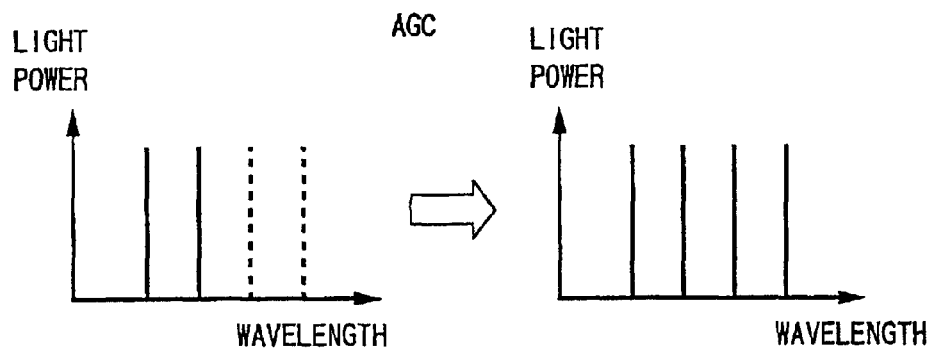
FIG. 13 is a view showing a situation where the number of wavelength channels is changed in a general AGC system.
Figure 14:
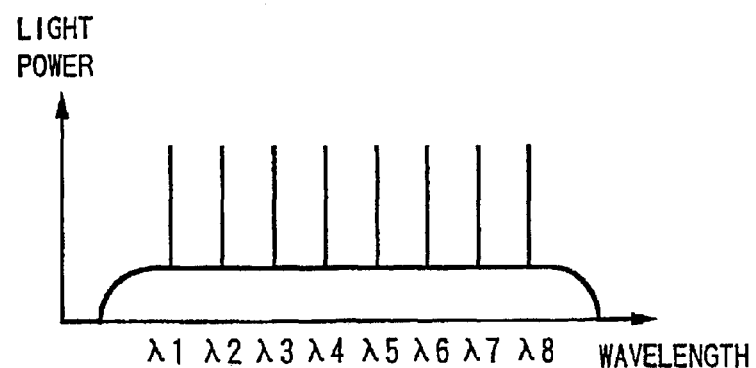
FIG. 14 is a view showing an exemplary spectrum of an amplified optical wavelength division multiplexed transmission signal.

FIG. 8(C) shows wavelength characteristics of a light power of the output light from the port P1 of the WCSF 3', exhibiting that the port P1 outputs the signal component including the channel lights of respective wavelengths λ1 to λ8 and ASE light components around them. FIG. 8(D) shows wavelength characteristics of a light power of the output light from the port P2 of the WCSF 3', exhibiting that the port P2 outputs the ASE light components at the intermediate wavelength bands excluding the channel lights of the respective wavelengths λ1 to λ8.

The OSNR monitor 13 calculates an averaged value of the OSNR about the output signal light based on the electrical signal corresponding to the signal component output from the electric filter $5_1$ and the electrical signal corresponding to the noise component output from the electric filter $5_2$, and outputs the result as an OSNR monitored signal.

There will be concretely described hereinafter a calculation procedure of an OSNR in the OSNR monitor 13.

Firstly, as shown in FIG. 8C, the total light power $P1_{total}$ of the signal component to be output from the port P1 of the WCSF 3' can be represented by the following equation (1), using the value of the power $P_{SIG\text{-}total}$ (total signal light power) of the respective wavelength channel lights and the value of the ASE light power $P_{ASE1\text{-}total}$ near the respective wavelength channel lights:

$$P1_{total} = P_{SIG\text{-}total} + P_{ASE1\text{-}total} \qquad (1).$$

Further, as shown in FIG. 8D, the total light power $P2_{total}$ of the noise component to be output from the port P2 of the WCSF 3' can be represented by the following equation (2), using the value of ASE light power $P_{ASE2\text{-}total}$ at the wavelength bands intermediate between the respective wavelength channel lights.

$$P2_{total} = P_{ASE2\text{-}total} \qquad (2).$$

Here, since it is possible to consider that $P_{ASE1\text{-}total} \approx P_{ASE2\text{-}total}$, the total signal light power $P_{SIG\text{-}total}$ can be represented by the following equation (3) and the total noise light power $P_{ASE\text{-}total}$ can be represented by the following equation (4), from the above equations (1) and (2):

$$P_{SIG\text{-}total} = P1_{total} - P2_{total} \qquad (3); \text{ and}$$

$$P_{ASE\text{-}total} = P2_{total} \times 2 \qquad (4).$$

Further, the averaged light power $P_{SIG\text{-}average}$ per one wavelength channel light is represented by the following equation (5), assuming that m is the number of used wavelength channels:

$$P_{SIG\text{-}average} = P_{SIG\text{-}total}/m \qquad (5).$$

In addition, the averaged noise light power $P_{ASE\text{-}average}$ per one wavelength channel light can be represented by the following equation (6), assuming that $\Delta\lambda$ is an amplification band width of the optical amplifier, and $\Delta\lambda_{ch}$ is a wavelength channel band width (standardized band width) such as of a DMUX at a receiving station:

$$P_{ASE\text{-}average} = P_{ASE\text{-}total} \times \Delta\lambda_{ch}/\Delta\lambda \qquad (6).$$

Thus, the averaged value $OSNR_{average}$ of the OSNR's about the output signal light can be represented by the following equation (7), making use of the above equation (3) through equation (6):

$$OSNR_{average} = P_{SIG\text{-}average} / P_{ASE\text{-}average} = /(P2_{total} \times 2 \times m \times \Delta\lambda). \qquad (7)$$

In the controlling apparatus having the aforementioned constitution, the input signal light is amplified, for example, at the light level controlling part 1, and then output to the outside via the photocoupler 2, while a portion of the output signal light is branched and sent to the port Pc of the WCSF 3', similarly to the first embodiment.

At the WCSF 3', the WDM signal light input from the port Pc is separated into the signal component and the noise component which will be then output from the port P1 and port P2, respectively. It should be noted here that the ASE light component included in the monitoring light output from the port P1 is reduced to a half, as compared to the ASE light component input into the port Pc, regardless of the number of used wavelength channels (see FIG. 8A, FIG. 8C and FIG. 8D). In this way, there is reduced the ratio of the ASE light component to the total light power to be detected at the photoelectric converting part $4_1$ at the latter stage, thereby improving the level monitoring error of the ALC, by virtue of the usage of WCSF 3'.

Those optical signals including the signal component and noise component separated by the WCSF 3' are photoelectrically converted by the photoelectric converting parts $4_1$, $4_2$, respectively, and then sent to the electric filters $5_1$, $5_2$. Further, the monitor signal corresponding to the signal component to be output from the electric filter $5_1$ is sent to the comparator 7 and OSNR monitor 13, while the monitor signal corresponding to the noise component to be output from the electric filter $5_2$ is sent to the OSNR monitor 13.

Similarly to the first embodiment, the comparator 7 compares the monitor signal level from the electric filter $5_1$ with a reference signal level, and sends an output signal corresponding to the level difference to the light level controlling part 1. Note, the reference signal used here is set corresponding to the number of used wavelengths included in the input signal light. The light level controlling part 1 adjusts such as the gain of the optical amplifier corresponding to the level difference represented by the output signal from the comparator 7, and conducts the controlling for fixing the level of the output signal light.

At the OSNR monitor 13, there is calculated the averaged value $OSNR_{average}$ of the OSNR's concerning the output signal lights based on the relationship of the equation (7), making use of: the value of $P1_{total}$ represented by the monitor signal from the electric filter $5_1$; the value of $P2_{total}$ represented by the monitor signal from the electric filter $5_2$; and the channel information concerning the used wavelengths (concretely, the number m of used wavelengths, the amplification band width $\Delta\lambda$ and standardized band width $\Delta\lambda_{ch}$ of the optical amplifier). Further, the result of this calculation is output from the OSNR monitor 13, as the OSNR monitored signal.

According to the aforementioned fourth embodiment, a portion of the output signal light branched as the monitoring light for the ALC is separated into the signal component and the noise component by the WCSF 3', and the light level controlling part 1 is constant-output-level controlled based on the monitoring light power of the signal component. Thus, there can be reduced the level monitoring error of the ALC due to the ASE light component, thereby enabling realization of the ALC operation with higher precision. Further, by utilizing the monitor signals corresponding to the signal component and the noise component separated by the WCSF 3', the averaged OSNR concerning the output signal lights can be readily monitored without measuring the spectrum of the optical signals.

There will be now described a fifth embodiment of the present invention. In this embodiment, there is considered a situation where the AGC is conducted by separating the WDM signal light branched for the monitoring, into a signal component and a noise component making use of a WCSF.

FIG. 9 is a view showing a constitution of a controlling apparatus for a wavelength division multiplexing optical amplifier according to the fifth embodiment.

This apparatus in FIG. 9 is provided by arranging a constitution for monitoring a portion of the input signal light also at the input side of the light level controlling part 1 to thereby render the light level controlling part 1 to AGC operate based on the level difference of the input light and output light, in the constitution of the aforementioned fourth embodiment. Further, the difference of the constitution of this apparatus from that of the second embodiment shown in FIG. 3 resides in that: there are adopted a WCSF 3' and a WCSF 9', instead of the WCSF 9 at the input side and the WCSF 3 at the output side, respectively; the monitor signal selecting/controlling parts 12, 6 at the input and output sides, respectively, are omitted such that the output signals from the electric filters $11_1$, $5_1$ are sent to the comparator 7'; and there are further provided an OSNR monitor 14 for monitoring the OSNR's of the input signal lights, and an OSNR monitor 13 for monitoring the OSNR's of the output signal lights.

The WCSF 9' has a transmission wavelength characteristic identical with that of the WCSF 3' as shown in FIG. 8, and separates a portion of the input signal light branched by the photocoupler 8 into a signal component and a noise component, to output the signal component from the port P1 and the noise component from the port P2.

The OSNR monitor 14 has a function identical with that of the OSNR monitor 13 at the output side as specifically described in the aforementioned fourth embodiment. This OSNR monitor 14 calculates an averaged value of the OSNR's concerning the input signal lights based on the electrical signal corresponding to the signal component output from the electric filter $11_1$ and the electrical signal corresponding to the noise component output from the electric filter $11_2$, and outputs the result of the calculation as an OSNR monitor signal.

In the controlling apparatus having the aforementioned constitution, the portions of the respective WDM signal lights input into/output from the light level controlling part 1 are branched by the photocouplers 8 and 2, respectively, and sent to the ports Pc of the WCSF' 9' and 3', respectively. At each of the WCSF' 9' and 3', the WDM signal light input into the associated port Pc is separated into a signal component and a noise component which are then output from the associated port P1 and port P2. The output lights from the port P1 and port P2 of the WCSF' 9' and 3' are converted into electrical signals by the photoelectric converting parts $10_1$, $10_2$, $4_1$, $4_2$ connected to the respective ports, and then sent to the electric filters $11_1$, $11_2$, $5_1$, $5_2$, respectively. Further, the monitor signals corresponding to the signal components output from the electric filters $11_1$, $5_1$, respectively, are sent to the comparator 7' and also to the OSNR monitors 14, 13, respectively. On the other hand, the monitor signals corresponding to the noise components output from the electric filters $11_2$, $5_2$, respectively, are sent to the OSNR monitors 14, 13, respectively.

Similarly to the second embodiment, the comparator 7' compares the monitor signal level from the electric filter $11_1$ at the input side with the monitor signal level from the electric filter $5_1$ at the output side, and sends an output signal corresponding to the level difference to the light level controlling part 1. The light level controlling part 1 adjusts the optical amplifying operation (gain setting) such as of an optical amplifier corresponding to the output signal from the comparator 7', to thereby conduct the constant-gain controlling.

Further, at the OSNR monitors 14, 13 at the input and output sides, there are calculated the averaged values $OSNR_{average}$ of the OSNR's concerning the input signal lights and the output signal lights, respectively, based on the relationship of the equation (7), making use of: the values of $P1_{total}$ represented by the monitor signals from the electric filters $11_1$, $5_1$, respectively; the values of $P2_{total}$ represented by the monitor signals from the electric filters $11_2$, $5_2$, respectively; and the channel information concerning the used wavelengths. Further, the results of these calculations are output as the OSNR monitored signals, respectively.

According to the aforementioned fifth embodiment, portions of the input signal light and output signal light branched as the monitoring light for the AGC are separated into the signal components and the noise components by the WCSF's 9' and 3', respectively, and the light level controlling part 1 is constant-gain controlled based on the monitoring light powers of the respective signal components. Thus, there can be reduced the level monitoring error of the AGC due to the ASE light component, thereby enabling realization of the AGC operation with higher precision. Further, by utilizing the monitor signals corresponding to the signal components and the noise components separated by the WCSF's 9' and 3', respectively, the averaged OSNR's concerning the input and output signal lights can be readily monitored, respectively, without measuring the spectrum of the optical signals.

In the aforementioned fifth embodiment, the OSNR monitors are provided for both of the input side and output side. However, the present invention is not limited thereto, and it is possible to provide an OSNR monitor at only one of the input side and output side. It is even possible to omit OSNR monitors, when it is unnecessary to monitor an OSNR (optical signal to noise ratio). Moreover, such an application can be obviously adopted that the constitutions of the fourth and fifth embodiments are combined with each other similarly to the aforementioned third embodiment, to thereby simultaneously realize the ALC and AGC.

What is claimed is:

1. A controlling apparatus for controlling an operation of a wavelength division multiplexing optical amplifier to collectively amplify wavelength division multiplexed signal light including a plurality of channel lights of different wavelengths, comprising:

optical branching means for branching a portion of said wavelength division multiplexed signal light;

optical separating means having a transmission wavelength characteristic which periodically varies corresponding to the wavelength channel intervals of said wavelength division multiplexed signal light, and separating the portion of the wavelength division multiplexed signal light branched by said optical branching means into a signal component including the channel lights of respective wavelengths and noise lights around the channel lights and a noise component including the noise lights existing in wavelength bands between the respective wavelength channel lights;

light power measuring means capable of measuring the light power of the signal component separated by said optical separating means; and controlling means for controlling the operation of said wavelength division multiplexing optical amplifier based on the light power of the signal component measured by said light power measuring means.

2. A controlling apparatus for a wavelength division multiplexing optical amplifier of claim 1, wherein said optical branching means includes an output side branching part for branching a portion of the wavelength division multiplexed signal light output from said wavelength division multiplexing optical amplifier; and wherein said controlling means includes a constant-output-level controlling part for controlling the operation of said wavelength division multiplexing optical amplifier such that the output light level is constant, based on the light power of the signal component measured by said light power measuring means.

3. A controlling apparatus for a wavelength division multiplexing optical amplifier of claim 1, wherein said optical branching means includes an input side branching part for branching a portion of the wavelength division multiplexed signal light input into said wavelength division multiplexing optical amplifier, and an output side branching part for branching a portion of the wavelength division multiplexed signal light output from said wavelength division multiplexing optical amplifier;

wherein said optical separating means includes: an input side separating part for separating the portion of the wavelength division multiplexed signal light branched by said input side branching part into the signal component and the noise component; and an output side separating part for separating the portion of the wavelength division multiplexed signal light branched by said output side branching part into the signal component and the noise component;

wherein said light power measuring means includes: an input side light power measuring part capable of measuring the light power of the signal component separated by said input side separating part; and an output side light power measuring part capable of measuring the light power of the signal component separated by said output side separating part; and wherein said controlling means includes a constant-gain controlling part for controlling the operation of said wavelength division multiplexing optical amplifier such that the level difference of the input light and output light of said wavelength division multiplexing optical amplifier is constant, based on the light powers of the signal components measured by said input side light power measuring part and said output side light power measuring part, respectively.

4. A controlling apparatus for a wavelength division multiplexing optical amplifier of claim 1, wherein said light power measuring means is capable of measuring the light powers of the signal component and the noise component separated by said optical separating means; and wherein said controlling apparatus further comprises:
OSNR calculating means for calculating an averaged value of OSNR's of said wavelength division multiplexed signal light, making use of the light powers of the signal component and the noise component measured by said light power measuring means, respectively, and making use of channel information concerning used wavelengths.

5. A controlling method for controlling an operation of a wavelength division multiplexing optical amplifier to collectively amplify wavelength division multiplexed signal light including a plurality of channel lights of different wavelengths, comprising:

an optical separating step for branching a portion of said wavelength division multiplexed signal light, and separating the thus branched portion into a signal component including the channel lights at respective wavelengths and noise lights around the channel lights and a noise component including the noise lights existing in wavelength bands between the respective wavelength channel lights;

a light power measuring step for measuring the light power of the signal component separated by said optical separating step; and a controlling step for controlling the operation of said wavelength division multiplexing optical amplifier based on the light power of the signal component measured by said light power measuring step.

6. A controlling method of a wavelength division multiplexing optical amplifier of claim 5, wherein said optical separating step branches a portion of the wavelength division multiplexed signal light output from said wavelength division multiplexing optical amplifier; and wherein said controlling step controls the operation of said wavelength division multiplexing optical amplifier such that the output light level is constant, based on the light power of the signal component measured by said light power measuring step.

7. A controlling method of a wavelength division multiplexing optical amplifier of claim 5, wherein said optical separating step branches a portion of the wavelength division multiplexed signal light input into said wavelength division multiplexing optical amplifier to separate the thus branched portion into said signal component and said noise component, and branches a portion of the wavelength division multiplexed signal light output from said wavelength division multiplexing optical amplifier so as to separate the thus branched portion into said signal component and said noise component;

wherein said light power measuring step measures the light powers of the signal components at an input side and an output side separated by said optical separating step; and wherein said controlling step controls the operation of said wavelength division multiplexing optical amplifier such that the level difference of the input light and output light of said wavelength division multiplexing optical amplifier is constant, based on the light powers of the signal components measured by said light power measuring step.

8. A controlling method of a wavelength division multiplexing optical amplifier of claim 5, wherein said light power measuring step measures the light powers of the signal component and the noise component separated by said optical separating step; and wherein said controlling method further comprises:
an OSNR calculating step for calculating an averaged value of OSNR's of said wavelength division multiplexed signal lights, making use of the light powers of the signal component and the noise component measured by said light power measuring step, respectively, and making use of channel information concerning used wavelengths.

\* \* \* \* \*